(12) United States Patent
Harata et al.

(10) Patent No.: US 12,326,304 B2
(45) Date of Patent: Jun. 10, 2025

(54) INNER SPIRAL GROOVED TUBE WITH EXCELLENT HEAT TRANSFER PROPERTY AND HEAT EXCHANGER

(71) Applicant: MA Aluminum Corporation, Minato-ku (JP)

(72) Inventors: Toshihiro Harata, Numazu (JP); Masayuki Nakamoto, Fuji (JP); Takuya Okawa, Numazu (JP); Yusuke Nakaura, Mishima (JP)

(73) Assignee: MA Aluminum Corporation, Minato-ku (JP)

( * ) Notice: Subject to any disclaimer, the term of this patent is extended or adjusted under 35 U.S.C. 154(b) by 223 days.

(21) Appl. No.: 17/780,924

(22) PCT Filed: Nov. 27, 2020

(86) PCT No.: PCT/JP2020/044398
§ 371 (c)(1),
(2) Date: May 27, 2022

(87) PCT Pub. No.: WO2021/107153
PCT Pub. Date: Jun. 3, 2021

(65) Prior Publication Data
US 2022/0412669 A1    Dec. 29, 2022

(30) Foreign Application Priority Data
Nov. 29, 2019  (JP) .................................. 2019-217340

(51) Int. Cl.
*F28F 1/40*    (2006.01)
(52) U.S. Cl.
CPC ...................................... *F28F 1/40* (2013.01)

(58) Field of Classification Search
CPC ................................... F28F 13/12; F28F 1/40
(Continued)

(56) References Cited

U.S. PATENT DOCUMENTS 4,044,797 A * 8/1977 Fujie ..................... F28F 13/187
165/184
7,267,166 B2 * 9/2007 Leterrible ................. F28F 1/40
165/184

(Continued)

FOREIGN PATENT DOCUMENTS

CN         1445506 A        10/2003
CN       101416016 A         4/2009
(Continued)

OTHER PUBLICATIONS

English Translation, JP 2012002453, Jan. 5, 2012; Nijo et al. (Year: 2012).*

(Continued)

*Primary Examiner* — Tho V Duong
(74) *Attorney, Agent, or Firm* — Oblon, McClelland, Maier & Neustadt, L.L.P.

(57) ABSTRACT

An inner spiral grooved tube includes: a tube body; and grooves and fins aligned in an inner circumferential direction of the tube body, wherein the grooves and the fins are formed in a spiral along a longitudinal direction, an outer diameter is 3 mm or more and 10 mm or less, a number of the fins is 30 to 60, made of a metal, a cross sectional shape of each of the fins has a rectangular shape having an apex angle of 0±10°, a ratio h/f is 0.90 or more and 3.40 or less, h being a fin height and f being fin width, a ratio c/f is 0.50 or more and 3.80 or less, c being a fin spacing, and an average of the ratio h/f and the ratio c/f is 0.8 or more and 3.3 or less.

2 Claims, 10 Drawing Sheets

(58) Field of Classification Search
USPC .......................................................... 165/184
See application file for complete search history.

(56) References Cited

U.S. PATENT DOCUMENTS

| | | | | |
|---|---|---|---|---|
| 2002/0096314 | A1* | 7/2002 | Liu | B21C 37/20 |
| | | | | 165/184 |
| 2005/0061492 | A1* | 3/2005 | Kurihara | F28F 1/42 |
| | | | | 165/150 |
| 2007/0199684 | A1* | 8/2007 | Sasaki | F28F 1/40 |
| | | | | 165/183 |
| 2015/0377563 | A1* | 12/2015 | Taras | F28F 1/40 |
| | | | | 165/183 |

FOREIGN PATENT DOCUMENTS

| | | | |
|---|---|---|---|
| CN | 104296583 | A | 1/2015 |
| JP | 6-190476 | A | 7/1994 |
| JP | 2012-2453 | A | 1/2012 |
| JP | 2018-91610 | A | 6/2018 |
| JP | 6391140 | B2 | 9/2018 |
| KR | 10-2002-0004526 | A | 1/2002 |

OTHER PUBLICATIONS

International Search Report issued Dec. 28, 2021 in PCT/JP2020/044398, filed on Nov. 27, 2020, 4 pages (With English Translation).

Korean Office Action issued in Korean Patent Application No. 10-2022-7020418 on Feb. 15, 2025, with English Translation, citing document 15 therein.

Chinese Office Action and Search Report issued in Chinese Patent Application No. 202080094846.X on Mar. 29, 2025.

* cited by examiner

INNER SPIRAL GROOVED TUBE WITH EXCELLENT HEAT TRANSFER PROPERTY AND HEAT EXCHANGER

CROSS-REFERENCE TO RELATED APPLICATIONS

The present application is a 35 U.S.C. § 371 national stage application of International patent application PCT/JP2020/044398, filed Nov. 27, 2020, which is based on and claims the benefit of priority to Japanese Application 2019-217340, filed Nov. 29, 2019. The entire contents of these applications are incorporated herein by reference.

TECHNICAL FIELD

The present invention relates to an inner spiral grooved tube with excellent heat transfer property and a heat exchanger.

Priority is claimed on Japanese Patent Application No. 2019-217340, filed Nov. 29, 2019, the content of which is incorporated herein by reference.

BACKGROUND ART

Conventionally, copper alloy tubes have been used for heat transfer tubes in fin-and-tube type heat exchangers. However, due to the depletion of copper resources, rising copper ingot prices, and recyclability, aluminum alloy heat transfer tubes, which are lightweight, inexpensive, and highly recyclable, are beginning to be used.

In heat transfer tubes made of copper or an aluminum alloys, ones with spiral grooves on the inner surface are proposed in order to enhance their thermal characteristics. The spiral grooves on the inner surface increase the area of the inner circumference of the tube and also improve wettability by capillary action, thereby winding up the refrigerant and increasing the circumferential length that contributes to heat transfer.

As a conventional method for manufacturing internally spiral grooved tube, a groove rolling method is known in which a grooving plug supported by a connecting rod is placed inside a tube body, a rolling ball is freely rotated circumferentially on the outer side of the tube body, and the rolling ball presses the outer circumferential wall of the tube body while pulling the tube body out to form the groove (See Patent Literature 1).

However, when manufacturing inner spiral grooved tubes with small diameters by the groove rolling method, it is difficult to shape the spiral grooves. Therefore, a technology has been proposed to form well-shaped inner spiral grooves by simultaneously applying drawing and twisting to drawn tubes with straight grooves on the inner surface (see Patent Literature 2).

In addition, by using the method of simultaneously applying the drawing and twisting processes, it has become possible to manufacture internally spiral grooved tubes with a groove shape in which the groove opening width is smaller than the groove bottom width, in other words, with inverted trapezoidal spiral fins in the cross section, which could not be manufactured using the groove rolling method (see Patent Literature 3).

CITATION LIST

Patent Literature

[Patent Literature 1]
  Japanese Unexamined Patent Application, First Publication No. H06-190476
[Patent Literature 2]
  Japanese Patent (Granted) Publication No. 6391140
[Patent document 3]
  Japanese Unexamined Patent Application, First Publication No. 2018-091610

SUMMARY OF INVENTION

Technical Problem

As explained above, various improvements have been made in the manufacturing technology for an aluminum alloy inner spiral grooved tubes. However, in response to recent environmental concerns, there is a need to further improve the heat transfer characteristics of inner spiral grooved tubes.

The purpose of this invention is to provide inner spiral grooved tubes with better heat transfer property.

Solution to Problem

The inner spiral grooved tube in accordance with an aspect of the present invention is an inner spiral grooved tube including: a tube body; and a plurality of grooves and a plurality of fins aligned in an inner circumferential direction of the tube body, wherein the grooves and the fins are formed in a spiral along a longitudinal direction of the tube body, an outer diameter of the tube body is 3 mm or more and 10 mm or less, a number of the fins formed on an inner peripheral surface of the tube body is 30 to 60, the inner spiral grooved tube is made of a metal, a cross sectional shape of each of the fins in a cross section of the tube body has a rectangular shape having an apex angle of 0±10°, a ratio h/f is 0.90 or more and 3.40 or less, h being a fin height and f being fin width, a ratio c/f is 0.50 or more and 3.80 or less, c being a fin spacing between adjacent fins in the inner circumferential direction of the tube body, and an average obtained by summing the ratio h/f and the ratio c/f and dividing a sum in half is 0.8 or more and 3.3 or less.

The fins having a rectangular cross sectional shape referred in explanations of the present invention differ from the high-slim-fin shape having an elongated cross sectional shape manufactured by the groove rolling method, for example for example.

In the inner spiral grooved tube, it is preferable that the fins are arranged with an equal spacing in the inner circumferential direction of the tube body.

In the inner spiral grooved tube, it is preferable that the cross sectional shape of each of the fins in the cross section of the tube body has a rectangular shape having an apex angle of 0±10° and the average of the ratio h/f and the ratio c/f is 2.0 or more and 2.8 or less.

In the inner spiral grooved tube, it is preferable that the cross sectional shape of each of the fins has a rectangular shape having an apex angle of 0±5°, and the average of the ratio h/f and the ratio c/f is 2.4 or more and 2.6 or less.

In the inner spiral grooved tube, it is preferable that the tube body is made of aluminum or an aluminum alloy.

Other aspect of the present invention is a heat exchanger including the inner spiral grooved tube according to any one of the above-described inner spiral grooved tubes.

Advantageous Effect

According to the aspects of the present invention, it is possible to secure a long wetted-edge length for the refrigerant flowing inside and to provide an inner spiral-grooved tube with excellent heat transfer property in which the refrigerant can easily penetrate between the fins, since, in an inner spiral grooved tube having an outer diameter of 3 mm or more and 10 mm or less and 30-60 fins, and made of metal, the cross sectional shape of each of the fins in the cross section of the tube body has a rectangular shape having an apex angle of 0±10°, the ratio h/f is 0.90 or more and 3.40 or less, h being a fin height and f being fin width, and the ratio c/f is 0.50 or more and 3.80 or less, c being a fin spacing.

If the frontage between the fins is small, it is difficult for the refrigerant to penetrate into the spiral grooves, which tends to deteriorate the heat transfer property. On the other hand, the longer the wetted-edge length, the better heat transfer property.

In the inner spiral grooved tube having an outer diameter of 3 mm or more and 10 mm or less and 30-60 fins, and made of metal, the rectangular cross sectional fins of the above-described dimension cannot be manufactured by the conventional rolling method. However, spiral grooved tubes with spiral fins grooves of the above-described dimension can be obtained by a manufacturing method in which twisting and drawing are simultaneously applied to extruded raw tubes.

When the spiral fin height is increased, the fins extend higher toward the center of the inner spiral grooved tube, so the frontage between the tips of adjacent fins becomes narrower.

In the inner spiral grooved tube having an outer diameter of 3 mm or more and 10 min or less and 30-60 fins, and made of metal, it is necessary to secure a minimum frontage for the refrigerant to penetrate into the tube. In doing so, it is preferable to select the above-described ranges in relation to the height of the fins, fin top width and the number of the on the inner surface of the inner spiral grooved tube.

DESCRIPTION OF EMBODIMENTS

Figure 1:
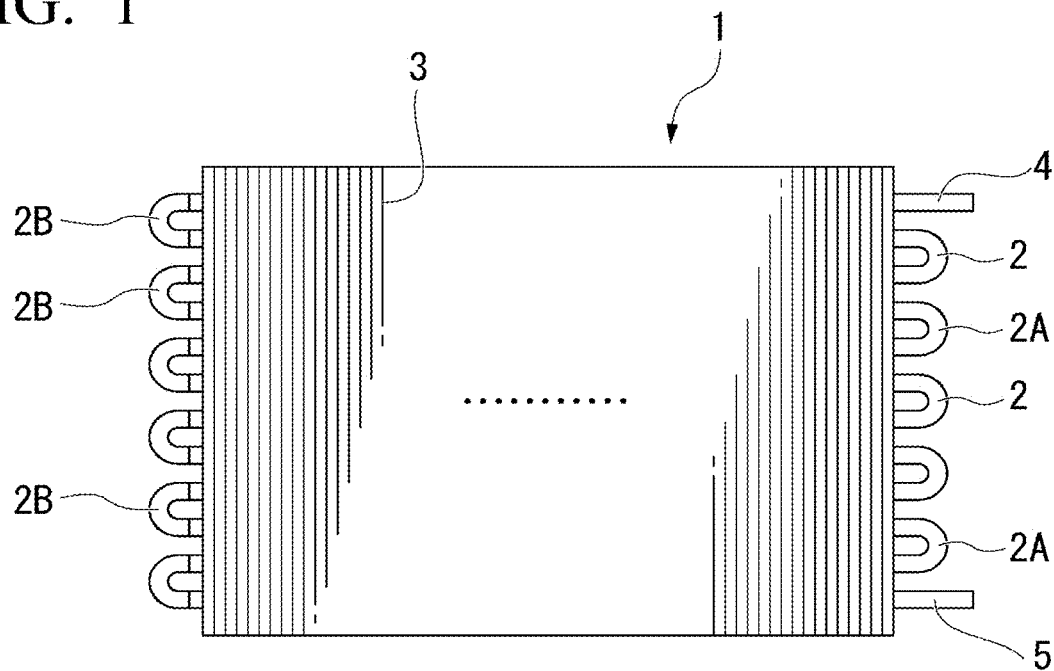
FIG. 1 is a front view of an example of a heat exchanger with an inner spiral grooved tube of the first embodiment.

The following is a description of the embodiment of the invention with reference to the drawings.

In the drawings used in the following explanations, the characteristic parts may be enlarged and highlighted for the sake of convenience. For the same purpose, parts that are not characteristic may be omitted from the drawings.

Figure 2:
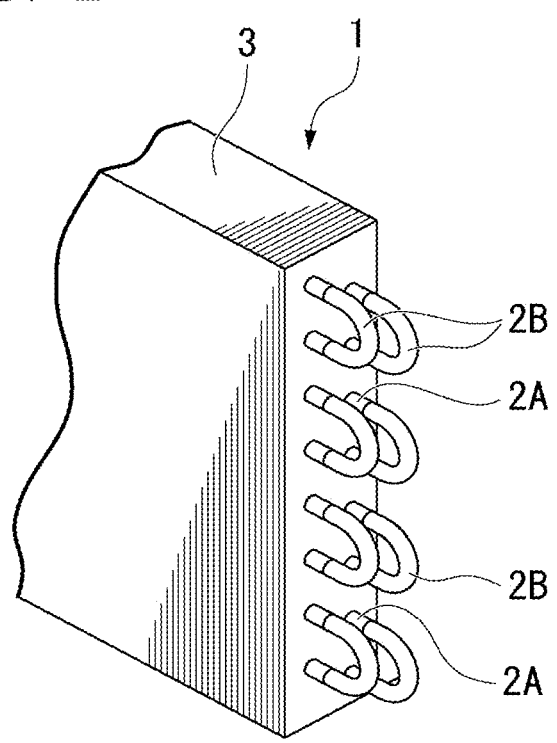
FIG. 2 is a partial view of the example of the heat exchanger.

FIGS. 1 and 2 show a schematic diagram of a heat exchanger with an inner spiral grooved tube of the first embodiment of the present invention.

In this example, the heat exchanger 1 is constructed with two tubes with inner spiral grooves as tubes through which the refrigerant passes, and a plurality of aluminum plate-like heat dissipating plate 3 are arranged in parallel around the inner spiral grooved tubes. The inner spiral-grooved tube 2 is a meandering tube. The inner spiral-grooved tube 2 is provided in such a way that it meanders through a plurality of insertion holes provided to penetrate the individual heat dissipating plates 3 arranged in parallel.

In the heat exchanger 1, the inner spiral grooved tube 2 consists of main tubes 2A in a U-shaped and elbow tubes 2B in a U-shape. Each of the main tube 2As passes through the heat dissipating plates 3 in a straight line. Each of the elbow tube 2B connects end adjacent openings of adjacent main tubes 2A. The main tubes 2A in a U-shape and the elbow tubes 2B in a U-shape are formed by bending the inner spiral grooved tube 2 into a U-shape, which will be explained later. An inlet 4 of the refrigerant is formed at one end of the inner spiral-grooved tube 2, which meanders through the heat dissipating plates 3, and an outlet 5 of the refrigerant is formed at the other end of the inner spiral-grooved tube 2, thereby forming a heat exchanger 1.

The heat exchanger 1 in this configuration is assembled by mechanically joining the main tubes 2A and the heat dissipating plates 3 by passing the inner spiral grooved tubes with a slightly smaller diameter than the main tube 2A through the insertion hole in the heat dissipating plates 3, expanding the inner spiral grooved tube to form the main tube 2A. In the heat exchange 1, connecting the main tubes 3A and the heat dissipating plates 3 is not limited to the above-described mechanical joining method. Connecting may be done by other joining method such as brazing. In terms of tube expansion, any known tube expansion methods such as hydraulic, plug, or air expansion may be used.

[Inner Spiral Grooved Tube]

Figure 3:
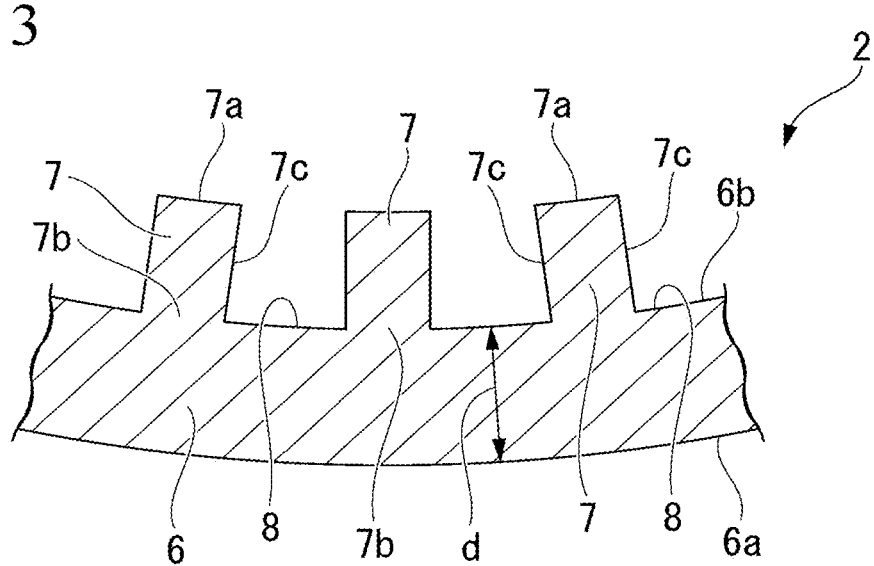
FIG. 3 is a cross sectional view of the inner spiral grooved tube of the first embodiment.

The inner spiral grooved tube 2 used for the heat exchange 1 is specifically explained below. FIG. 3 is a cross sectional view of the inner spiral grooved tube of the first embodiment.

FIG. 3 is a cross sectional view of the inner spiral grooved tube 2 of the first embodiment.

Figure 4:
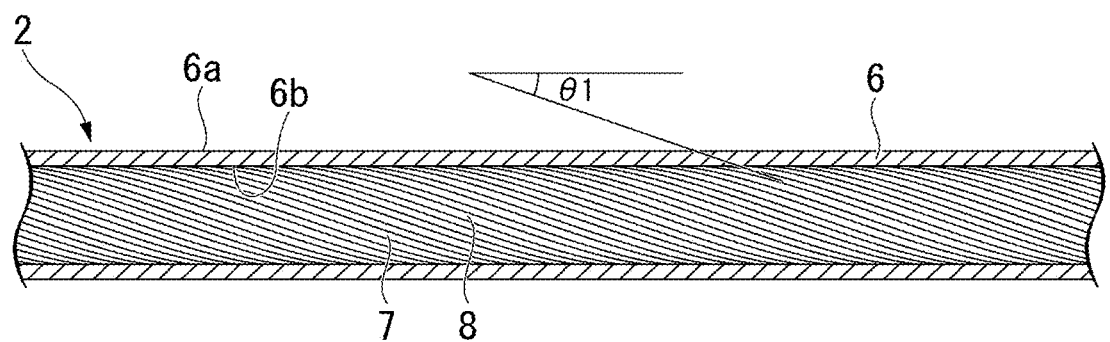
FIG. 4 is a longitudinal sectional view of the inner spiral grooved tube.

FIG. 4 is a longitudinal sectional view of the inner spiral grooved tube 2.

The inner spiral grooved tube 2 in the present embodiment is a twisted material of the extruded raw tube described below. The inner spiral-grooved tube 2 can be made of aluminum or an aluminum alloy. When an aluminum alloy is used for the inner spiral grooved tube 2, there are no restrictions on the aluminum alloy to be used. Pure aluminum alloys defined by JIS, such as 1050 series, 1100 series, 1200 series and the like can be used. Alternatively, aluminum alloys of 3000 series represented by 3003 series, to which Mn is added, and the like can be used. In addition, the inner spiral grooved tubes 2 may be constituted by using any one of other aluminum alloys of 5000 to 7000 series defined by JIS.

In addition, the inner spiral grooved tube 3 may be made of an aluminum alloy not defined by JIS. In this embodiment, the inner spiral-grooved tube 2 made of aluminum or an aluminum alloy is used as an example, but the heat transfer tube intended in this invention is applicable to any material that can be drawn by a drawing die. Therefore, tubes made of other alloys, such as copper alloys or iron alloys, may also be used in the present embodiment.

The inner spiral grooved tube 2 shown in FIG. 3 includes a tube body 6 that is circular in cross-sectional outline. The outer diameter of the tube body 6 (the diameter of the circle drawn by the outer circumferential surface 6a of the tube body 6) is, for example, between 3 mm and 10 mm or less. On the inner circumferential surface 6b of the tube body 6, there are 30 to 60 fins 7 spirally formed along the longitudinal direction of the tube body 6 at predetermined intervals in the inner circumferential direction of the tube body 6.

As shown in FIG. 4, in the inner spiral grooved tube 2, the spiral fin 7 and the spiral groove 8 extend with a constant twist angle θ1 in the longitudinal direction of the tube body 6.

The twist angle θ1 of the individual fin 7 or the spiral groove 8 is the angle between: the extended line of the part drawn in a straight line of the spiral groove or the spiral fine shown in the inner central part of the tube; and the central axis line of the tube body 2 (or parallel lines of the central axis line) in the longitudinal section of the inner spiral grooved tube 2 as shown in FIG. 4.

Figure 7:
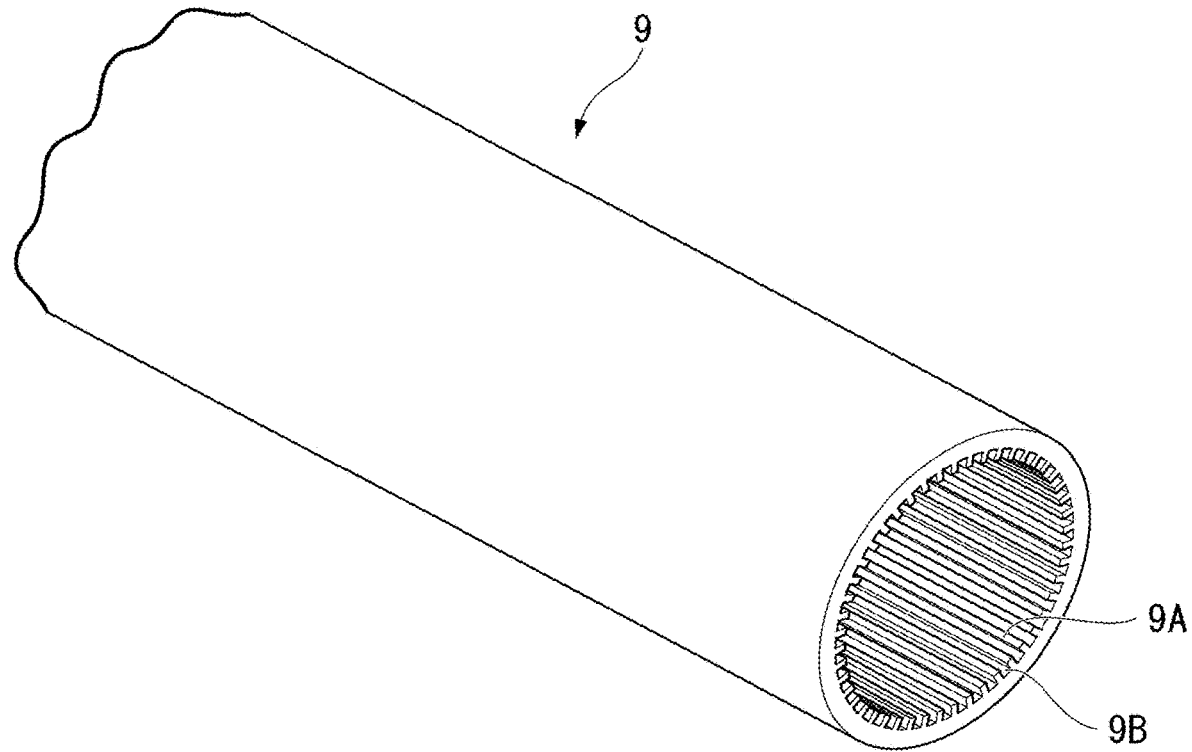
FIG. 7 is a perspective view of an raw tube (straight grooved tube) used in the manufacturing method of the inner spiral grooved tube.

By forming spiral fins 7 at predetermined intervals on the inner surface 6b of the tube body 6, the heat exchange efficiency between the inner spiral grooved tube 2 and the refrigerant flowing therein can be increased. The inner spiral grooved tube 2 with spiral fins 7 can be formed by twisting while drawing the raw tube 9 shown in FIG. 7, in which straight fins and straight grooves extending in a straight line in the longitudinal direction are formed by the extrusion process. The tube 2 can be formed by twisting the raw tube 9 shown in FIG. 7 while drawing it out. FIG. 7 shows an example of fins 9A and grooves 9B formed on the raw tube 9.

As shown in FIG. 3 in a cross-sectional view of a portion of the tube body 6, the fin 7 is formed in a rectangular shape in the cross section. The rectangular shape is made of the tip part 7a located on the interior side of the tube body 6, the bottom part 7b located on the periphery side, and a pair of the sidewall parts 7c located between the tip part 7a and bottom part 7b.

The bottom part 7b of fin 7 is located on the inner circumference of the tube body 6 and is continuous with the inner surface 6h. In other words, it is continuous with the bottom surface of the spiral groove 8. The sidewall part 7c extends linearly along the radial direction of the tube body 6 in the cross-section of the tube body 6 shown in FIG. 3. The wall thickness from the bottom of the spiral groove 8 to the outer circumference of the tube body 6 in the cross section of the tube body 6 can be denoted as the bottom wall thickness (d).

Figure 5:
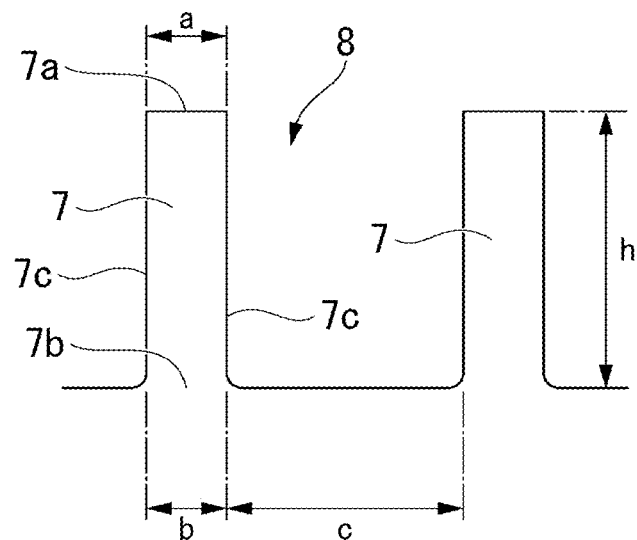
FIG. 5 is an explanatory drawing showing an example of the spiral fins grooves formed on the inner surface of the tube with an inner spiral groove.

In the inner spiral grooved tube 2 with the structure shown in FIGS. 3 and 4, the plurality of fins 7 are provided in the circumferential direction on the inner circumferential surface of the tube body 6. In each of the fins 7, the width of the tip part 7a and the width of the bottom part 7b are the same or substantially the same. Thus, the widths of the spiral grooves 8 formed between adjacent fins 7, 7 in the circumferential direction of the tube body 6 are the same or substantially the same on the groove bottom side and the groove opening side When two fins 7 adjacent to each other in the inner circumferential direction of the tube body 6 are shown adjacent to each other on the left and right as shown in FIG. 5, the fin height (h) is defined as the distance from the groove bottom of the spiral groove 8 to the tip part 7a of the fin 7. The fin top width (a) is defined as the width of the tip part 7a of the fin 7. The fin bottom width (b) is defined as the width of the bottom part 7b of the fin 7. The fin spacing (c) is defined as the spacing between two adjacent fins 7.

In the fin 7 shown in FIG. 5, since the left and right sidewalls 7c are parallel or substantially parallel, the fin top width (a) and the fin bottom width (b) are the same or substantially the same. The definition of the left and right sidewalls 7c and 7c being parallel or substantially parallel will be explained later.

In the state shown in FIG. 5, the fins 7, 7 are depicted in a model representation and adjacent to each other on the left and right, but as shown in FIG. 3, the inner surface of the tube body 6 6b is arc-shaped with a predetermined curvature. Therefore, the groove width of the spiral groove 8 formed between the adjacent fins 7, 7 is slightly wider at the groove bottom side and gradually narrows toward the groove opening side.

In the inner spiral grooved tube 2 of this embodiment, the outer diameter of the tube body 6 is between 3 mm and 10 mm or less, and about 30 to 60 fins 7 are formed in the inner circumferential direction of the tube body 6 (30 to 60 strips), for example. The height of fin 7 (the radial dimension of the tube body 6) is between about 0.13 mm or more and 0.55 mm or less. The bottom wall thickness of the inner spiral grooved tube 2 (the wall thickness of the tube body 6 corresponding to the bottom of the spiral groove 8) is between 0.3 mm or more and 0.6 mm or less. The fin top width, which is the thickness of fin 7, is between 0.07 mm or more and 0.2 mm or less. The fin top width, which is the thickness of fin 7, is about 0.07 mm or more to 0.2 mm or less.

Figure 6:
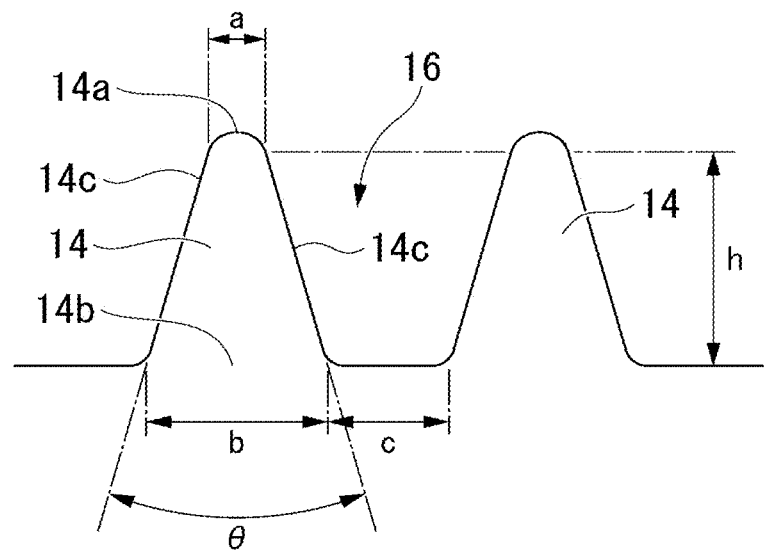
FIG. 6 is an explanatory drawing showing an example of spiral fins and grooves formed on the inner surface of a conventional tube with an inner spiral groove.

On the other hand, unlike the fin 7 shown in FIG. 5, in the case of a fin 14, which has a general and conventional structure of isopod trapezoidal shape as shown in FIG. 6, the tip part 14a is formed in a convex with curvature (a radius) and the sidewalls 14c, 14c are slanted so that the tip side is tapered. Therefore, in the fin 14, the center of the convex forming the tip of the tip part 14a is considered to be the tip of the fin 14. The fin height (h) is defined as the distance from this center to the bottom of the spiral groove 8. The fin top width (a) is defined as the inside diameter of the convex forming the tip of the tip part 14a.

In fin 14, the bottommost portions of sidewalls 14c, 14c are close to each other, and the distance between the bottommost portions of the sidewall parts 14c, 14c is defined as the fin spacing (c). Strictly speaking, as shown in FIG. 6, at the bottom of the sidewall parts 14c, 14c, as shown in FIG. 6, a radius (concave with curvature) of about 0.05 mm is formed in the portion connecting to the bottom surface of the spiral groove 16 in the bottom most portions of the sidewall parts 14c, 14c. Thus, in such a case, the fin spacing (c) is defined as the distance between the bottommost portions of sidewall parts 14c, 14c on the left and the right, assuming the locations where the extended surfaces of the sidewall part 14c and the bottom surface of the spiral groove 16 intersect.

In fin 14 shown in FIG. 6, the fin widths are different on the upper and lower sides. So in fin 14, the fin width (f) is defined as the average of the upper width and the lower width as f=(a+b)/2.

In the fin 14 shown in FIG. 6, the angle formed by the sidewalls 14c, 14c is defined as the fin apex angle (θ).

In the fin 7 shown in FIG. 5, the fin apex angle (θ) is not shown in the figure because the sidewalls 7c, 7c are parallel or practically parallel. Thus, In the fin 7, the fin apex angle is defined as 0 when the sidewalls 7c, 7c are parallel. The fin apex angle, defined as the angle formed by the sidewalls 7c, 7c in the fin 7, is in the range of 0±10°, and preferably in the range of 0±5°.

Situations that the fin apex angle (θ) is 0±10° include a case where the cross section of the fin 7 is in an isosceles trapezoid shape, each of the sidewalls 7c, 7c being slanted 0 to +5° in such way that they are narrowed upward slightly with reference to the fin apex angle (0°) where each of the sidewalls 7c, 7c are perfectly in parallel. They also include a case where the cross section of the fin 7 in an inverse isosceles trapezoid shape, each of sidewalls 7c being slanted negatively to −5° in such a way that they spread upward slightly with reference to the fin apex angle of 0°. In other words, the cross sections of the fins 7 shown in FIGS. 3 and 5 being in a rectangular shape includes a case where the fin apex angle (θ) is slanted in an extent of 0° or more and +5° or less; and a case where the fin apex angle (θ) is slanted in an extent of 0° or less and +5° or more.

As explained above, the fin apex angle being less than 0° or less and −5° or more means that the cross-sectional shape of the fin 7 is in an inverse isosceles trapezoid shape. Similarly, the fin apex angle being less than 0° or more and +5° or less means that the cross-sectional shape of the fin 7 is in an isosceles trapezoid shape. Strictly speaking, these shapes are not a rectangular shape. However, they are referred as a rectangular shape as long as the fin apex angle is in a range of 0±10° in this specification.

Similarly, situation that the fin apex angle is in a range of 0±5° includes a case where the cross section of the fin 7 is in an isosceles trapezoid shape, each of the sidewalls 7c, 7c being slanted in such a way that they are narrowed upward slightly; and a case where it is in an inverse isosceles trapezoid shape, each of them being slanted in such a way that they spread slightly. It means that they includes a case where each sidewalls 7c is slanted 0° or more and +2.5° or less; and a case where it is slated 0° or less and −2.5° or more As explained above, in this embodiment, for convenience, the positive fin apex angle means the case where the cross sectional shape of the fin 7 is in an isosceles trapezoid shape with the sidewalls 7c being slanted in a positive angle and narrowed upward; and the negative fin apex angle means the case where the cross sectional shape of the fin 7 is in an inverse isosceles trapezoid shape with the sidewalls 7c being slanted in a negative angle and spreading upward.

In the present embodiment of inner spiral grooved tube 2, it is preferable that the outer diameter is between 3 mm and 10 mm; about 30 to 60 fins 7 are formed in the inner circumferential direction; the fin height is 0.13 mm or more and 0.55 mm or less; the bottom wall thickness is 0.3 mm or more and 0.6 mm or less; and the fin top width is 0.07 mm or more and 0.2 mm or less.

In the inner spiral grooved tube 2 having the above-described dimension, if the fin top width is too wide, the radial opening frontage of the spiral groove 8 becomes too narrow, making it difficult for refrigerant to enter the spiral groove 8, which may worsen heat transfer performance. In addition, the pressure loss of the refrigerant increases. By setting the fin apex angle to 0±10°, the opening frontage of the spiral groove 8 can be made large enough in the fin 7 having the above-described dimension, and the flow of refrigerant into the spiral groove 8 can be ensured. Accordingly, the heat transfer to the refrigerant can be improved and the flow of the refrigerant can be smoothed.

In addition, by setting the fin height and fin top width in the above-described ranges, the fins 7 can be made thin and long, ensuring sufficient wetting edge length between the refrigerant and the fins and sufficient heat transfer area to ensure good heat transfer coefficient.

In the inner spiral grooved tube 2, the ratio (h/f) of fin height (h) to fin width (f) is set to 0.90 or more and 3.40 or less.

By setting the ratio (h/f) to 0.90 or more, the wetting edge length of the fin 7 can be secured as much as possible. If it is below the lower limit, the wetting edge length is insufficient. If (h/f) exceeds 3.40, the heat exchange performance will be degraded due to poor refrigerant inflow caused by narrowing of the frontage.

In the inner spiral grooved tube 2, the ratio (c/f) of the distance (c) between fins adjacent to each other in the circumferential direction of the tube body to the fin width (f) is set to 0.50 or more and 3.80 or less.

By setting the ratio (c/f) to 0.50 or more, the ease of refrigerant penetration into the spiral grooves can be ensured. If it is below the lower limit, it becomes difficult for the refrigerant to penetrate into the spiral grooves. If the ratio (c/f) exceeds 3.80, the wetting edge length becomes insufficient, and if this is accompanied by a reduction in the number of fin strips, the refrigerant winding effect is reduced, which leads to a decrease in heat exchange performance.

It is preferable that the average value of the ratio (h/f) and the ratio (c/f) is set to 0.8 or more and 3.3 or less, since the heat exchange performance varies depending on the balance between the fin height, the fin width, and the fin spacing. Therefore, the average value of the ratio (h/f) and the ratio (c/f) is set to 0.8 or more and 3.3 or less. It is preferable that the average value is 2.0 or more and 2.8 or less. It is more preferable that it is 2.4 or more and 2.6 or less.

Conventionally, spiral grooves have been formed on copper-alloy and aluminum-alloy spiral grooved tubes by a manufacturing method generally referred to as the groove rolling method. In the groove rolling method, the tube is pressed against a grooved plug on the inner surface of the tube with a rolling ball from the outer circumference of the tube, and grooves are formed in the valley of the grooved plug by plastic flow. Therefore, even if all grooves were ideally manufactured, the frontage on the apex side (center side of the tube) of the fin 14 was larger than that on the bottom side. Moreover, in the groove rolling method, it was difficult to achieve the ideal fin 14 shape shown in FIG. 6, and the fin 14 shape was generally manufactured as a significantly distorted shape.

On the other hand, in the spiral grooved tube 2 of this embodiment, since the fin 7 of the above-described dimension is formed, the suppression of the film thickness of the refrigerant formed around the fin 7; the effect that refrigerant can easily enter and exit the spiral groove 8 due to the dimension of the frontage between the fins 7 and 7; and the effect that the wetting edge length is lengthened by the presence of the rectangular fins 7, can be obtained. By having the above-described benefits, high evaporation and condensing heat transfer coefficients can be obtained.

<Manufacturing Method>

Figure 8:
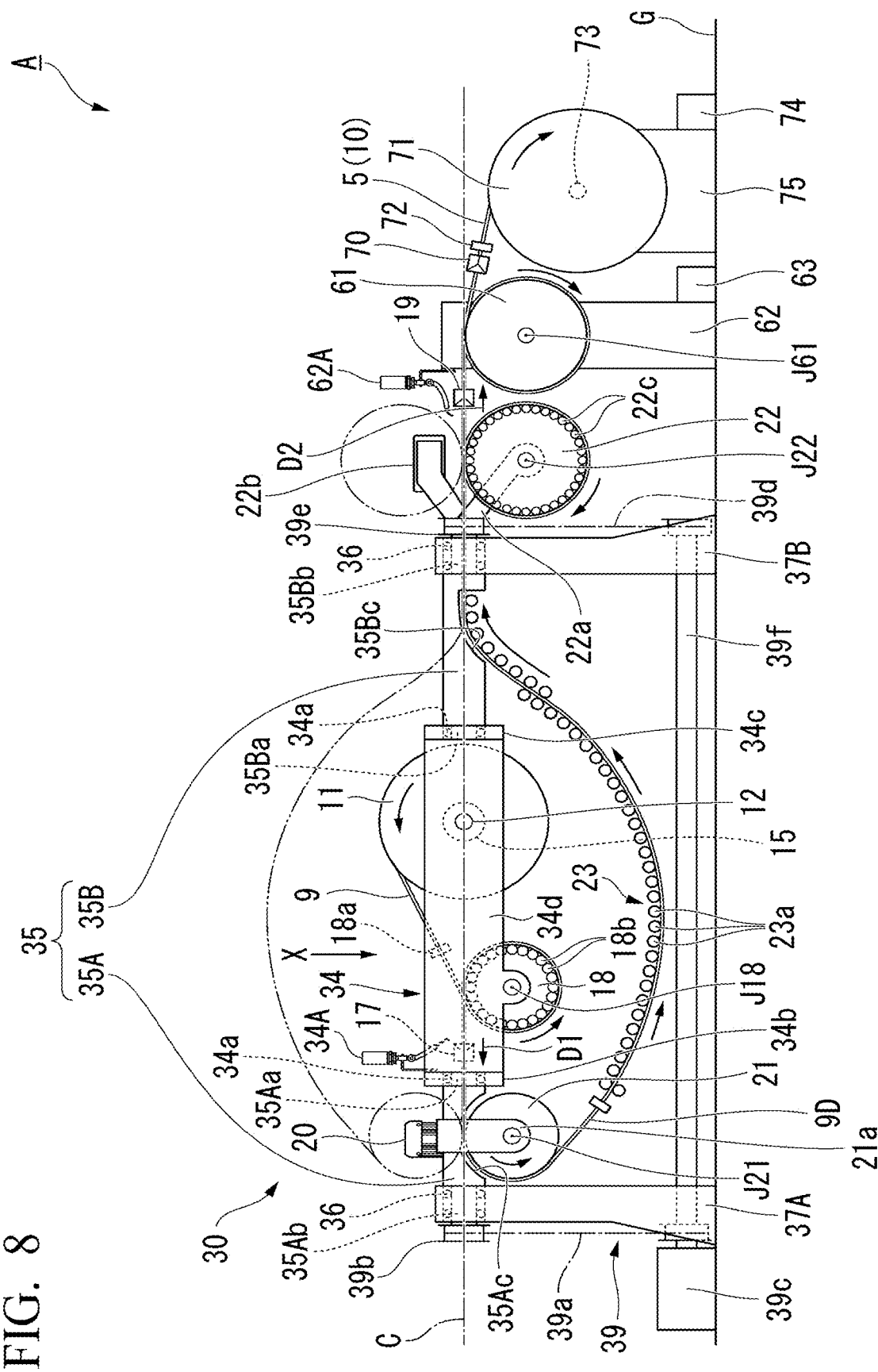
FIG. 8 is a side view of an example of manufacturing apparatus used in the production of the inner spiral grooved tubes.
Figure 9:
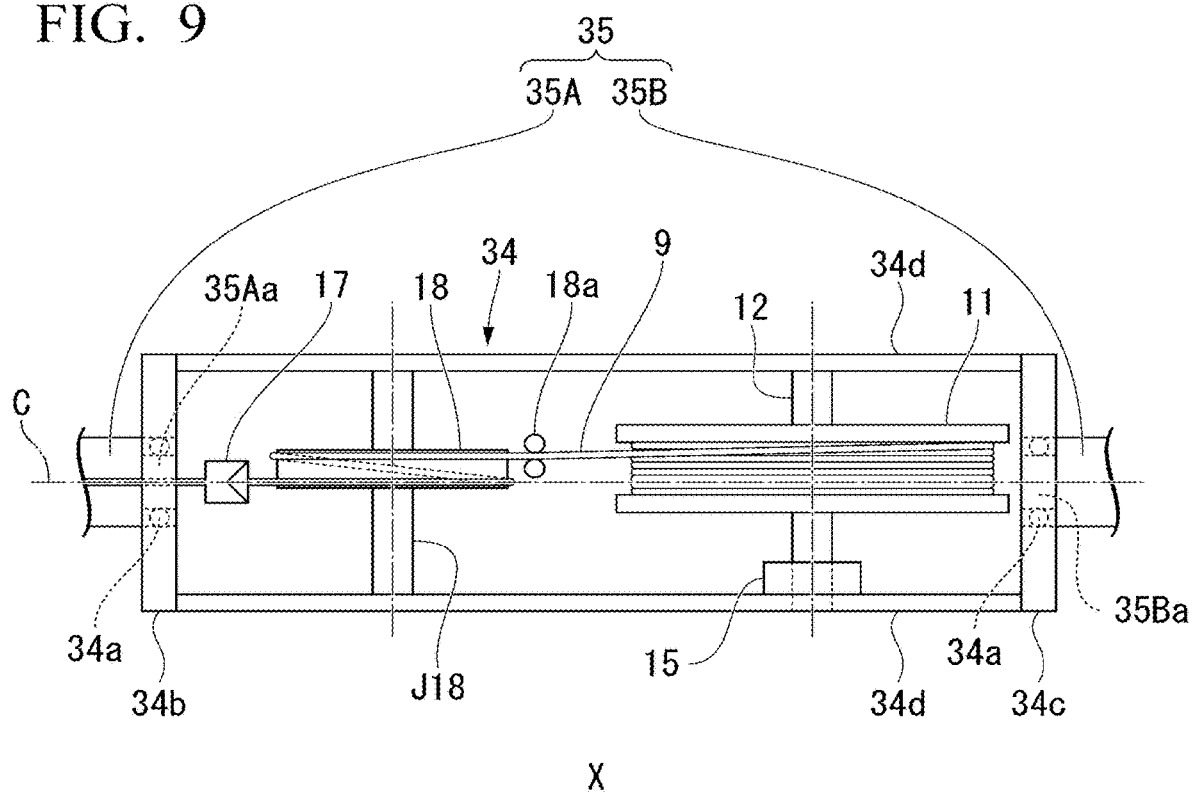
FIG. 9 is a plan view showing a state in which a raw tube is unwound by winding on the unwinding-side capstan in the manufacturing apparatus of the inner spiral grooved tubes.

To produce the rectangular-shaped fin 7 in cross section shown in FIGS. 3 and 5 from the raw tube 9 shown in FIG. 7, as an example, the manufacturing apparatus A shown in FIGS. 8 and 9 can be used.

<Extrusion Forming Step>

A billet made of aluminum or an aluminum alloy is extruded to produce the raw tube 9 shown in FIG. 7. On the inner surface of this raw tube 9, straight fins 9A and straight grooves 9B are formed at equal intervals in the inner circumferential direction.

The corner of the fin 9A and the corner of straight groove 9B, which are formed on the raw tube 9 during the extrusion process, have a radius of curvature of 0.05-0.025 mm. Due to the accuracy of the radius of curvature, it is possible to produce a rectangular cross-sectional shape inside the tube with multiple fins equivalent to the cross-sectional shape shown in FIG. 3 or FIG. 5.

<Twisting and Drawing Step>

Next, the twisting and drawing step is described.

The twist and drawing step is the process of forming the inner spiral grooved tube 2 with spiral fins 7 and spiral grooves 8 by applying twist to the above-described raw tube 9 while drawing.

<Manufacturing Apparatus for Twisting and Drawing Step>

FIG. 8 shows a side view of the manufacturing apparatus A for producing 2 inner spiral grooved tubes by performing two twist-drawing steps on 9 raw tubes. First, an overview of the manufacturing apparatus A is described.

The manufacturing apparatus A includes the revolving mechanism 30, the floating frame 34, the unwinding bobbin (first bobbin) 11, the first guide capstan 18, the first drawing die 17, the first revolving capstan 21, the revolving flyer 23, the second revolving capstan 22, the second drawing die 19, the second guide capstan 61, and the winding bobbin (second bobbin) 71. The details of each part are described below.

(Revolving Mechanism)

The revolving mechanism 30 includes the rotating shaft 35, the drive unit 39, the front stand 37A and the rear stand 37B. The rotating shaft 35 includes the front shaft 35A and the rear shaft 35B.

The revolving mechanism rotates the rotating shaft 35, the first revolving capstan 21, the second revolving capstan 22 and the revolving flyer 23. The first revolving capstan 21, the second revolving capstan 22 and the revolving flyer 23 are fixed on the rotating shaft 35.

The revolving mechanism 30 is retains the rotating shaft 35 and the floating frame 34 in a stationary state. The floating frame 34 is arranged coaxially with and supported by the rotating shaft 35.

Both the front shaft 35A and the rear shaft 35B have a hollow cylindrical shape inside. Both the front shaft 35A and the rear shaft 35B are arranged on the revolving rotation center axis C (pass line of the first drawing die) coaxially. The front shaft 35A is rotatably supported by the front stand 37A via the bearing type bearing 36 and extends toward the back side (rear stand 37B side) from the front stand 37A. Similarly, the rear shaft 35B is rotatably supported by the rear stand 37B via the bearing and extends toward the fore side (front stand 37A side) from the rear stand 37B. The floating frame 34 bridges the front shaft 35A and the rear shaft 35B.

The drive unit 39 includes the drive motor 39c, the linear motion shaft 39f, the belts 39a, 39d, and the pulleys 39b, 39e. The drive unit 39 rotates the front shaft 35A and the rear shaft 35B.

The drive motor 39c rotates the linear motion shaft 39f. The linear motion shaft 39f extends forward and backward at the lower part of the front stand 37A and the rear stand 37B.

On the fore end part 35Ab of the front shaft 35A, the pulley 39b is attached on the penetrating tip. The pulley 39b is linked to the linear motion shaft 39f via the belt 39a. Similarly, on the back end portion 35Bb of the rear shaft 35B, the pulley 39e is attached on the penetrating tip. The pulley 39e is linked to the linear motion shaft 39f via the belt 39d. As a result, the front shaft 35A and the rear shaft 35B rotate synchronously about the revolving rotation center axis C.

The first revolving capstan 21, the second revolving capstan 22 and revolving flyer 23 are fixed to the rotating shaft 35 (the front shaft 35A and the rear shaft 35B). As the rotary shaft 35 rotates, these components fixed to the rotary shaft 35 revolve and rotate about the revolving rotation center axis C.

(Floating Frame)

The floating frame 34 is supported by the front shaft 35A and the rear shaft 35B of the rotating shaft 35 on the end portion 35Aa of the front shaft 35A and the end portion 35Ba of the rear shaft 35B via the bearings 34a. The end portion 35Aa and the end portions 35Ba face each other. The floating frame 34 supports the unwinding bobbin 11, the first guide capstan 18 and the first drawing die 17.

FIG. 9 is a plan view of the floating frame 34 viewed from the direction of arrow X in FIG. 8. As shown in FIGS. 8 and 9, the floating frame 34 has the box shape with openings at the top and bottom. The floating frame 34 includes the front wall 34b and the rear wall 34c facing front and rear. In addition, the floating frame 34 includes the supporting walls 34d that face on left and right and extend in the forward and backward directions.

The front wall 34b and the rear wall 34c are provided with through holes. Each of the end portion 35Aa of the front shaft 35A and the end portion 35Ba of the rear shaft 35B penetrates through each of the through holes. One of bearings 34a is interposed between each of the end portions 35Aa and 35Ba and each of the through holes of the front wall 34b and the rear wall 34c. This made it harder for the rotation of the rotating shaft 35 (the front shaft 35A and the rear shaft 35B) to be transmitted to the floating frame 34. The floating frame 34 is retained in stationary with respect to the ground U even if the rotating shaft 35 is in a rotating state. The stationary state of the floating frame 34 may be stabilized by installing a weight that biases the center of gravity of the floating frame 34 with respect to the revolving rotation center axis C.

As shown in FIG. 9, the pair of support walls 34*d* are arranged on both sides of the unwinding bobbin 11, the first guide capstan 18 and the first drawing die 17 on both sides in the left-right direction (vertical direction in FIG. 9 paper plane). The pair of support walls 34*d* are used to support the bobbin support shaft 12 holding the unwinding bobbin 11 and the rotationally supporting the rotation shaft J18 of the first guide capstan 18. The support walls 34*d* also support the first drawing die 17 via the die support, which is not shown in the figure.

(Unwinding Bobbin)

The unwinding bobbin 11 is wound with the raw tube 9. The unwinding bobbin 11 winds out the raw tube 9 and supplies it to the subsequent stage. The unwinding bobbin 11 is removably attached to the bobbin support shaft 12.

As shown in FIG. 8, the bobbin support shaft 12 extends orthogonally to the rotating shaft 35. The bobbin support shaft 12 is supported by the floating frame 34 in a self-rotating manner. The rotation means rotation around the center axis of the bobbin support shaft 12 itself. The bobbin support shaft 12 holds the unwinding bobbin 11 and rotates by itself in the feeding direction of the unwinding bobbin 11, assisting the unwinding of the raw tube 9 from the bobbin 11.

The bobbin support shaft 12 is provided with the brake part 15. The brake part 15 applies braking force to the self-rotation of the bobbin support shaft 12 with respect to the floating frame 34. In other words, the brake part 15 regulates the rotation of the unwinding bobbin 11 in the unwinding direction. The braking force by the brake part 15 adds backward tension to the raw tube 9 being conveyed in the unwinding direction.

(First Guide Capstan)

The first guide capstan 18 has a disk shape. The first guide capstan 18 is used to wind the raw tube 9 from the unwinding bobbin 11 around the first guide capstan 18. The first guide capstan 18 is wound around a circumference of the raw tube 9. The tangential direction of the outer circumference of the first guide capstan 18 coincides with the revolving rotation center axis C. The first guide capstan 18 guides the raw tube 9 along the first direction D1 onto the revolving rotation center axis C.

The first guide capstan 18 is supported by the floating frame 34 in a rotationally free manner. The guide rollers 18*b*, which rotate freely on their own axis, are arranged in a row around the periphery of the first guide capstan 18 and. The first guide capstan 18 of this embodiment has guide rollers 18*b* that rotate individually and the raw tube 9 is conveyed smoothly. In FIG. 8, the guide rollers 18*b* are omitted.

As shown in FIG. 8, between the first guide capstan 18 and the unwinding bobbin 11, the tube route guiding part 18*a* is provided. The tube route guiding part 18*a* is, for example, guide rollers arranged to surround the raw tube 9. The tube route guiding part 18*a* guides the raw tube 9 supplied from the unwinding bobbin 11 to the first guide capstan 18.

(First Drawing Die)

The first drawing die 17 reduces the diameter of the raw tube 9. The first drawing die 17 is fixed to the floating frame 34. The drawing direction of the first drawing die 17 is the first direction D1. The center of the first drawing die 17 coincides with the revolving rotation center axis C of the rotating shaft 35. The first direction D1 is parallel to the revolving rotation center axis C.

The first drawing die 17 is supplied with a lubricating oil by the lubricating oil supply unit 34 A, which is fixed to the floating frame 34.

The intermediate twisted tube 9D, which has passed through the first drawing die 17, is introduced into the front wall 34*b* of the floating frame 34 and is introduced into the interior of the front shaft 35A through the through hole.

(First Revolving Capstan)

The first revolving capstan 21 has a disk shape. The first revolving capstan 21 has the side hole 34Ac that radially penetrates through the inside and outside of the hollow front shaft 35A. The first revolving capstan 21 is supported by the support 21*a* fixed on the outer periphery part of the rotating shaft 35 (the front shaft 35A) having the center of the disk as the axis of rotation J21.

The first revolving capstan 21 has one of its outer circumference tangents coincides with the revolving rotation center axis C.

The raw tube 9 that is conveyed in the first direction D1 on the revolving rotation center axis C is wound more than once on the first revolving capstan 21. The first revolving capstan 21 winds the tube material and draws it outside from the inside of the front shaft 35A and guides it to the revolving flyer 23.

The first revolving capstan 21 revolves with the front shaft 35A around the revolving rotation center axis C. The revolving rotation center axis C extends orthogonally to the rotation axis J21 of the revolution of the first revolving capstan 21. The tube material is given a twist between the first revolving rotation capstan 21 and the first drawing die 17. By this first drawing and twisting step, the raw tube 9 is processed into the intermediate twisted tube 9D.

Together with the first revolving capstan 21, the drive motor 20 is provided to the front shaft 35A. The drive motor 20 drives and rotates the first revolving capstan 21 in the winding direction (the conveying direction) of the tube material. Thereby, the first revolving capstan 21 imparts a forward tension to the tube material to pass through the first drawing die 17.

(Revolving Flyer)

The revolving flyer 23 reverses the tube route of the intermediate twisted tube 9D between the first drawing die 17 and the second drawing die 19. The revolving flyer 23 reverses the intermediate twisted tube 9D and directs the conveying direction toward the second direction D2, which is the drawing direction of the second drawing die 19. More specifically, the revolving flyer 23 guides the intermediate twisted tube 9D from the first revolving capstan 21 to the second revolving capstan 22.

The revolving flyer 23 includes guide rollers 23*a* and the guide roller supports (not shown in the figure) that support the guide rollers 23*a*. The guide roller supports are supported by the rotating shaft 35, although the illustration of the guide roller supports is omitted here to eliminate complexity. However, the guide rollers are not essential for the structure of the flyer; it can be a plate-like structure with a ring for the tube to pass through.

The guide rollers 23*a* are arranged in parallel forming an outwardly curved arch shape relative to the revolving rotation center axis C. The guide rollers 23*a* themselves roll to convey the intermediate twisted tube 9D smoothly. The revolving rotation flyer 23 revolves around: the floating frame 34; and the first drawing die 17 and the unwound bobbin 11 that are supported inside of the floating frame 34, centering on the revolving rotation center axis C.

One end of the revolving rotation flyer 23 is located outside the first revolving rotation capstan 21 relative to the revolving rotation center axis C. The other end of the revolving rotation flyer 23 passes through the side hole 35Bc that radially penetrates through the inside and outside of the hollow rear shaft 35B, and extends to the inside of the rear shaft 35B. The revolving flyer 23 guides the intermediate twisted tube 9D that is let out by being wounded up on the first revolving capstan 21 to the side of the rear shaft 35B. In addition, the revolving capstan 23 feed the intermediate twisted tube 9D in such a way that the intermediate twisted tube 9D coincides with the revolving rotation center axis C along the second direction D2 inside of the rear shaft 35B.
(Second Revolving Capstan)

The second revolving capstan 22 has a disk shape similar to the first revolving capstan 21. The second revolving capstan 22 is supported by the support 22a in a state of free rotation. The support 22a is provided on the tip of the end portion 35Bb of the rear shaft 35B. In addition, the guide rollers 22c that rotate themselves freely are arranged side by side on the outer periphery of the second revolving capstan 22. In the second revolving capstan 22 of the present embodiment, each of the guide rollers 22c rotate individually. The rotation of them allows smooth conveying of the tube material.

The second revolving capstan 22 has one of its outer circumference tangents coincides with the rotation center axis C.

On the second revolving capstan 22, the tube material 5 conveyed in the second direction D2 on the rotation center axis C is wound around the second revolving capstan 22. The second revolving capstan 22 feeds the wound tube material in the second direction D2 on the rotation center axis C.

The second revolving capstan 22 rotates with the rear shaft 35B around the rotation center axis C. The rotation center axis C is extended in the direction orthogonal to the rotation axis J22 of the second revolving capstan 22. The intermediate twisted tube 9D, which is fed from the second revolving capstan 22, is reduced in diameter in the second drawing die 19. Since the second drawing die 19 is stationary with respect to the ground G, twist is applied to the intermediate twisted tube 9D between the second revolving capstan 22 and the second drawing die 19. With this second drawing and twisting step, the intermediate twisted tube 9D is processed into an inner spiral grooved tube 2.

The support 22a, which supports the second revolving capstan 22, supports the weight 22b on the location symmetrical to the second revolving capstan 22 with respect to the rotation center axis C. The weight 22b stabilizes the balance of the rotation of the rear shaft 35B.
(Second Drawing Die)

The second drawing die 19 is located at the rear of the second revolving capstan 22. The second drawing die 19 has the opposite second direction D2 as the drawing direction. The second direction D2 is parallel to the rotation center axis C. The second direction D2 is opposite to the first direction D1, which is the drawing direction of the first drawing die 17. The intermediate twisted tube 9D passes through the second drawing die 19 along the second direction D2. The second drawing die 19 is stationary with respect to the ground G. The center of the second drawing die 19 coincides with the rotation center axis C of the rotating shaft 35.

The second drawing die 19 is supported on the frame 62, for example, via a die support not shown in the figure. The second drawing die 19 is supplied with a lubricating oil by the lubricating oil supply unit 62A, which is mounted on the frame 62. This reduces the pulling force on the second drawing die 19.
(Second Guide Capstan)

The second guide capstan 61 has a disk shape. The tangential direction of the outer circumference of the second guide capstan 61 coincides with the revolving rotation center axis C. The inner spiral grooved tube 2 that is conveyed in the second direction D2 on the revolving rotation center axis C is wounded up on the second guide capstan 61 more than once.

The second guide capstan 61 is supported by the frame 62 in a rotation free manner around the rotation axis J61. The rotation axis J61 of the second guide capstan is linked with the drive motor 63 via a drive belt or the like. The second guide capstan 61 is driven and rotated by the drive motor 63 in the winding direction (the conveying direction) of the inner spiral grooved tube 2. It is preferable that the drive motor 63 is a torque motor that can control torque.

The second guide capstan 61 is driven to apply forward tension to the inner spiral grooved tube 2. As a result, the inner spiral grooved tube 2 is fed forward with the necessary drawing stress for processing on the second drawing die 19.
(Winding Bobbin)

Winding bobbin 71 is provided at the end of the tube route of the inner spiral grooved tube 2 to recover the inner spiral grooved tube 2. The pulley 72 is provided at the front of the winding bobbin 71.

The winding bobbin 71 is removably attached to the bobbin support shaft 73. The bobbin support shaft 73 is supported on the frame 75 and connected to the drive motor 74 via a drive belt or the like.
<Twisting and Drawing Step>

The method of manufacturing the inner spiral grooved tube 2 using the manufacturing apparatus A described above will be described below.

The raw tube 9 is set in the tube route in advance by feeding the raw tube 9 from the unwound bobbin 11. The setting is done by allowing the raw tube 9 to pass through: the first guide capstan 18; the first drawing die 17; the first revolving capstan 21; the revolving flyer 23; the second revolving capstan 61; the second drawing die 19; the second guide capstan; and the winding bobbin 71, in the order.

The first guide capstan 18 guides the raw tube 9 into the die hole of the first drawing die 17 located on the rotation center axis C.

Next, the raw tube 9 is passed through the first drawing die 17. Furthermore, the tube material is wound around the first revolving capstan 21 at the rear of the first drawing die 17 and rotated around the rotation axis. This reduces the diameter of the raw tube 9 and gives it a twist (first twisting and drawing step).

In the first twisting and drawing step, it is possible to apply an appropriate tension to the raw tube 9, which provides a stable twist angle without causing the tube material 5 to buckle or rupture.

By drawing the raw tube 9 through the first drawing die 17 and by the first revolving capstan, a twist is applied to the raw tube 9. Because of this, a twist is imparted to the straight fins 9A and the straight grooves 9B inside the raw tube 9.

The first twisting and drawing step makes the raw tube 9 into the intermediate twisted tube 9D. The intermediate twisted tube 9D is a tube material at an intermediate stage in the manufacturing process of the inner spiral grooved tube 2. It is in a state where fins and grooves having a shallower twist angle than the fins 7 and the grooves 9 of the inner spiral grooved tube 2 are formed.

Next, the intermediate twisted tube 9D is wound around the revolving flyer 23, and the conveyance direction is directed in the second direction D2 on the rotation center axis C. Further, the intermediate twisted tube 9D is wound around the second revolving capstan 22, and the intermediate twisted tube 9D is introduced into the second drawing die 19.

Next, the intermediate twisted tube 9D, which rotates with the second revolving capstan 22, is passed through the second drawing die 19. This reduces the diameter of the intermediate twisted tube 9D and applies a twist to the intermediate twisted tube 9D, further increasing the lead angle (the second twisting and drawing step). Through this second twisting and drawing step, the intermediate twisted tube 9D becomes the inner spiral grooved tube 2. Here, the inner spiral grooved tube 2 with the desired lead angle can be obtained.

<Finishing Drawing Step>

Next, the inner spiral grooved tube 2 is passed through the finishing drawing die 70 (the finishing drawing step). The surface of the inner spiral grooved tube 2 is ideally shaped by passing through the finishing drawing die 70.

According to the twisting and drawing step using manufacturing apparatus A described above, since twisting and drawing are performed simultaneously, it is possible to reduce the shear stress required for twisting in order to apply a combined stress of twisting and diameter reduction to the raw tube 9. Accordingly, a large amount of twist can be applied to the raw tube 9 before the buckling stress of the raw tube 9 is reached to the limit.

By reducing the wall thickness, the inner spiral grooved tube 2 can be made lighter and less expensive by reducing the material cost. In other words, according to this embodiment, lightweight, inexpensive, and highly efficient heat exchange inner spiral grooved tube 2 can be manufactured.

According to manufacturing apparatus A shown in FIGS. 8 and 9, the twisting directions in the first twisting and drawing step and the second twisting and drawing step are matched to give twist to the raw tube 9, facilitating mass production.

When only twist is applied to a thin tube 9, such as 3 to 10 mm, made of aluminum or an aluminum alloy, it easily buckles or breaks. In this manufacturing apparatus A, the drawing is applied simultaneously with the twisting to suppress buckling and rupture caused by twisting while drawing, so that even the above-mentioned size of raw tube 9 can be twisted without buckling or rupture.

In this specification, manufacturing apparatus A shown in FIGS. 8 and 9 is used as the manufacturing apparatus for manufacturing the inner spiral grooved tube 2 from the raw tube 9, but the manufacturing apparatus is not limited to this example. However, the manufacturing apparatus is not limited to this example, and other manufacturing apparatus that performs the twisting and drawing step described in Patent Publication No. 2016-22505, etc. may also be applied.

Varieties of extruded raw tubes having different sizes were produced by extruding raw tubes made of JISA3003 aluminum alloy from a billet. Each of them had a number of straight fins and a number of straight grooves alternately and equally spaced along the inner circumference and the entire length.

Next, those tubes were subjected to the twisting and drawing step using the manufacturing apparatus A shown in FIGS. 8 and 9 to produce the inner spiral grooved tubes of Examples 1-13 of the present invention and Comparative Examples 1-11. Table 1 shows the results of measuring the bottom wall thickness (mm), the fin height (mm), and the fin top width (mm) of the inner spiral grooved tubes in Examples 1, 2, 11, and 12 or the present invention; and Comparative Examples 1, 4. In addition, the average values of these values at eight circumferential locations are shown in Table 1.

TABLE 1

|  | 1 | 2 | 3 | 4 | 5 | 6 | 7 | 8 | AVE |
|---|---|---|---|---|---|---|---|---|---|
| Example 1 | | | | | | | | | |
| Whole | 0.819 | 0.806 | 0.807 | 0.787 | 0.792 | 0.790 | 0.812 | 0.803 | 0.802 |
| Bottom thickness | 0.460 | 0.439 | 0.449 | 0.438 | 0.446 | 0.445 | 0.441 | 0.442 | 0.445 |
| Fin height | 0.359 | 0.367 | 0.358 | 0.349 | 0.346 | 0.345 | 0.371 | 0.361 | 0.357 |
| Fin top width | 0.125 | 0.129 | 0.123 | 0.110 | 0.132 | 0.135 | 0.128 | 0.124 | 0.126 |
| Example 2 | | | | | | | | | |
| Whole | 0.636 | 0.663 | 0.683 | 0.689 | 0.669 | 0.652 | 0.627 | 0.625 | 0.656 |
| Bottom thickness | 0.419 | 0.433 | 0.448 | 0.452 | 0.442 | 0.421 | 0.409 | 0.408 | 0.429 |
| Fin height | 0.217 | 0.230 | 0.235 | 0.237 | 0.227 | 0.231 | 0.218 | 0.217 | 0.227 |
| Fin top width | 0.094 | 0.091 | 0.102 | 0.098 | 0.091 | 0.097 | 0.093 | 0.092 | 0.095 |
| Example 11 | | | | | | | | | |
| Whole | 0.714 | 0.718 | 0.722 | 0.732 | 0.724 | 0.728 | 0.728 | 0.714 | 0.723 |
| Bottom thickness | 0.437 | 0.442 | 0.447 | 0.442 | 0.439 | 0.433 | 0.435 | 0.429 | 0.438 |
| Fin height | 0.277 | 0.276 | 0.275 | 0.29 | 0.285 | 0.295 | 0.293 | 0.285 | 0.285 |
| Fin top width | 0.116 | 0.106 | 0.091 | 0.117 | 0.118 | 0.121 | 0.109 | 0.112 | 0.111 |
| Example 12 | | | | | | | | | |
| Whole | 0.719 | 0.727 | 0.729 | 0.739 | 0.763 | 0.758 | 0.767 | 0.741 | 0.743 |
| Bottom thickness | 0.432 | 0.434 | 0.436 | 0.444 | 0.457 | 0.462 | 0.470 | 0.463 | 0.450 |
| Fin height | 0.287 | 0.293 | 0.293 | 0.295 | 0.306 | 0.296 | 0.297 | 0.278 | 0.293 |
| Fin top width | 0.170 | 0.167 | 0.185 | 0.161 | 0.176 | 0.171 | 0.171 | 0.161 | 0.170 |
| C. Example 1 | | | | | | | | | |
| Whole | 0.694 | 0.682 | 0.687 | 0.697 | 0.690 | 0.698 | 0.698 | 0.696 | 0.693 |
| Bottom thickness | 0.425 | 0.422 | 0.418 | 0.420 | 0.417 | 0.432 | 0.432 | 0.431 | 0.425 |

TABLE 1-continued

|  | 1 | 2 | 3 | 4 | 5 | 6 | 7 | 8 | AVE |
|---|---|---|---|---|---|---|---|---|---|
| Fin height | 0.269 | 0.260 | 0.269 | 0.277 | 0.273 | 0.266 | 0.266 | 0.265 | 0.268 |
| Fin top width | 0.115 | 0.108 | 0.111 | 0.118 | 0.103 | 0.109 | 0.100 | 0.102 | 0.108 |
| Apex angle | 26.1 | 28.5 | 22.6 | 22.4 | 25.0 | 22.8 | 22.4 | 25.4 | 24.40 |
| C. Example 4 | | | | | | | | | |
| Whole | 0.569 | 0.574 | 0.578 | 0.568 | 0.578 | 0.577 | 0.572 | 0.566 | 0.573 |
| Bottom thickness | 0.400 | 0.400 | 0.393 | 0.390 | 0.406 | 0.401 | 0.396 | 0.397 | 0.398 |
| Fin height | 0.169 | 0.174 | 0.185 | 0.178 | 0.172 | 0.176 | 0.176 | 0.169 | 0.175 |
| Fin top width | 0.158 | 0.166 | 0.164 | 0.167 | 0.153 | 0.152 | 0.154 | 0.166 | 0.160 |
| Apex angle | 31.1 | 29.6 | 29.8 | 27.5 | 29.8 | 29.7 | 30.8 | 30.8 | 29.90 |

(unit: mm)

In addition, Tables 2 and 3 below show the results for Examples 1, 2, 11, and 12 of the present invention and Comparative Examples 1 and 4. The bottom wall thickness; the fin height (h: mm), the fin top width (a: mm), the spacing between fins (c mm), the fin width (f mm), the value of h/f, and the value of c/f, all of which were obtained from the average values in Table 1, are shown in Tables 2 and 3. In addition, the outer diameter of each inner spiral grooved tube; the number of strips; the fin apex angle)(°); the flow channel area (mm$^2$); the wetted edge length (mm); and the heat exchange performance of a single tube; the average value of the ratio h/f and the ration c/f are shown in Tables 2 and 3. Table 2 also shows results of other Examples and Comparative examples, measured in the same way as in Table 1 and obtained results as in Examples 1, 2, 11, and 12 and Comparative Examples 1 and 4.

The heat exchange performance of a single tube was evaluated using a double-tube structure. Refrigerant flowed in the inner tube (heat transfer tube) and water flowed in the outer tube in countercurrent, and the heat transfer coefficient in the inner tube was calculated from the temperature change at the inlet/outlet of the water. The pressure loss was evaluated by calculating the refrigerant pressure difference at the inlet/outlet of the inner tube.

The heat exchanger performance was evaluated in the heat exchanger performance evaluation results with a single tube at a refrigerant flow rate of approximately 20 kg/h. When the heat transfer coefficient of condensation was 6.5 kW/m$^2 \times$° C. or less and the heat transfer coefficient of evaporation was 8.0 kW/m$^2 \times$° C. or less, it was ranked as D (Bad).

When the heat transfer coefficient of condensation is more than 6.5 kW/m$^2 \times$° C. and 8.0 kW/m$^2 \times$° C. or less, and the heat transfer coefficient of evaporation was more than 8.0 kW/m$^2 \times$° C. and 12.0 kW/m$^2 \times$° C. or less, it was ranked as C (Mediocre).

When the heat transfer coefficient of condensation is more than 8.0 kW/m$^2 \times$° C. and 9.5 kW/m$^2 \times$° C. or less, and the heat transfer coefficient of evaporation was more than 8.0 kW/m$^2 \times$° C. and 12.0 kW/m$^2 \times$° C. or less, it was ranked as B (Good).

When the heat transfer coefficient of condensation is more than 9.5 kW/m$^2 \times$° C., and the heat transfer coefficient of evaporation was more than 12.0 kW/m$^2 \times$° C., it was ranked as A (Very Good).

TABLE 2

|  |  | Example 1 | Example 2 | Example 3 | Example 4 | Example 5 | Example 6 | Example 7 | Example 8 |
|---|---|---|---|---|---|---|---|---|---|
| Outer diameter | mm | 7.02 | 7.02 | 7.02 | 7.02 | 7.02 | 7.02 | 7.02 | 7.02 |
| Bottom thickness | d (mm) | 0.445 | 0.429 | 0.493 | 0.495 | 0.489 | 0.493 | 0.494 | 0.497 |
| Fin height | h (mm) | 0.357 | 0.227 | 0.140 | 0.348 | 0.196 | 0.230 | 0.392 | 0.241 |
| Fin top width | a (mm) | 0.126 | 0.095 | 0.159 | 0.118 | 0.104 | 0.193 | 0.124 | 0.143 |
| Strip number | Strips | 40 | 45 | 35 | 60 | 35 | 60 | 60 | 35 |
| Fin apex angle | θ (°) | 0 | 0 | −5 | −5 | 5 | 5 | 0 | −2.5 |
| Fin spacing | c (mm) | 0.269 | 0.254 | 0.395 | 0.228 | 0.421 | 0.103 | 0.192 | 0.408 |
| Fin width | f = (a + b)/2 | 0.123 | 0.091 | 0.153 | 0.103 | 0.113 | 0.203 | 0.124 | 0.138 |
| h/f |  | 2.902 | 2.495 | 0.916 | 3.385 | 1.741 | 1.133 | 3.161 | 1.750 |
| c/f |  | 2.187 | 2.791 | 2.583 | 2.220 | 3.742 | 0.507 | 1.547 | 2.965 |
| Flow channel area | mm$^2$ | 27.7 | 28.9 | 27.8 | 26.4 | 27.9 | 25.8 | 25.7 | 27.4 |
| Wetted edge length | mm | 44.4 | 36.1 | 29.2 | 62.6 | 32.1 | 45.4 | 66.0 | 36.2 |
| Single tube heat transfer performance |  | A | A | C | B | B | C | A | A |
| Average of the ratio h/f and the ratio c/f |  | 2.5 | 2.6 | 1.7 | 2.8 | 2.7 | 0.8 | 2.4 | 2.4 |

|  |  | Example 9 | Example 10 | Example 11 | Example 12 | Example 13 | C. Example 1 | C. Example 2 | C. Example 3 |
|---|---|---|---|---|---|---|---|---|---|
| Outer diameter | mm | 7.02 | 7.02 | 7.02 | 7.02 | 7.02 | 7.02 | 7.02 | 7.02 |
| Bottom thickness | d (mm) | 0.488 | 0.501 | 0.438 | 0.450 | 0.450 | 0.425 | 0.445 | 0.445 |
| Fin height | h (mm) | 0.285 | 0.432 | 0.285 | 0.293 | 0.293 | 0.268 | 0.442 | 0.355 |
| Fin top width | a (mm) | 0.131 | 0.119 | 0.111 | 0.170 | 0.170 | 0.108 | 0.126 | 0.125 |
| Strip number | Strips | 35 | 30 | 45 | 45 | 30 | 45 | 30 | 25 |
| Fin apex angle | θ (°) | 2.5 | 5 | 0 | 0 | 0 | 24.4 | 0 | 0 |
| Fin spacing | c (mm) | 0.399 | 0.474 | 0.233 | 0.179 | 0.350 | 0.149 | 0.270 | 0.504 |
| Fin width | f = (a + b)/2 | 0.137 | 0.138 | 0.112 | 0.163 | 0.163 | 0.152 | 0.122 | 0.123 |
| h/f |  | 2.077 | 3.134 | 2.540 | 1.798 | 1.798 | 1.764 | 3.623 | 2.887 |
| c/f |  | 2.908 | 3.435 | 2.080 | 1.098 | 2.147 | 0.980 | 2.213 | 4.098 |

TABLE 2-continued

| | | | | | | | | | |
|---|---|---|---|---|---|---|---|---|---|
| Flow channel area | mm² | 27.3 | 26.7 | 28.2 | 27.2 | 27.9 | 27.9 | 27.8 | 28.4 |
| Wetted edge length | mm | 38.5 | 43.7 | 41.1 | 42.1 | 33.2 | 36.3 | 38.4 | 33.5 |
| Single tube heat transfer performance | | A | C | B | C | B | D | D | D |
| Average of the ratio h/f and the ratio c/f | | 2.5 | 3.3 | 2.3 | 1.4 | 2.0 | 1.4 | 2.9 | 3.5 |

TABLE 3

| | | C. Example 4 | C. Example 5 | C. Example 6 | C. Example 7 | C. Example 8 | C. Example 9 | C. Example 10 | C. Example 11 |
|---|---|---|---|---|---|---|---|---|---|
| Outer diameter | mm | 7.02 | 7.02 | 7.02 | 7.02 | 7.02 | 7.02 | 7.02 | 7.02 |
| Bottom thickness | d (mm) | 0.398 | 0.498 | 0.503 | 0.502 | 0.495 | 0.496 | 0.499 | 0.497 |
| Fin height | h (mm) | 0.175 | 0.255 | 0.408 | 0.080 | 0.461 | 0.110 | 0.436 | 0.252 |
| Fin top width | a (mm) | 0.160 | 0.296 | 0.127 | 0.138 | 0.121 | 0.220 | 0.101 | 0.112 |
| Strip number | Strips | 40 | 50 | 35 | 35 | 50 | 60 | 65 | 35 |
| Fin apex angle | θ (°) | 29.9 | −10.0 | −5 | 5 | −2.5 | 2.5 | 5 | 0 |
| Fin spacing | c (mm) | 0.236 | 0.127 | 0.448 | 0.395 | 0.278 | 0.091 | 0.152 | 0.429 |
| Fin width | f = (a + b)/2 | 0.206 | 0.274 | 0.109 | 0.141 | 0.111 | 0.222 | 0.120 | 0.112 |
| h/f | | 0.848 | 0.932 | 3.737 | 0.565 | 4.156 | 0.495 | 3.633 | 2.250 |
| c/f | | 1.145 | 0.466 | 4.108 | 2.792 | 2.506 | 0.408 | 1.267 | 3.829 |
| Flow channel area | mm² | 29.0 | 25.0 | 26.8 | 28.0 | 26.0 | 27.1 | 25.1 | 27.5 |
| Wetted edge length | mm | 30.3 | 46.8 | 48.7 | 24.3 | 66.1 | 31.9 | 73.2 | 36.6 |
| Single tube heat transfer performance | | D | D | D | D | D | D | D | D |
| Average of the ratio h/f and the ratio c/f | | 1.0 | 0.7 | 3.9 | 1.7 | 3.3 | 0.5 | 2.4 | 3.0 |

Figure 10:
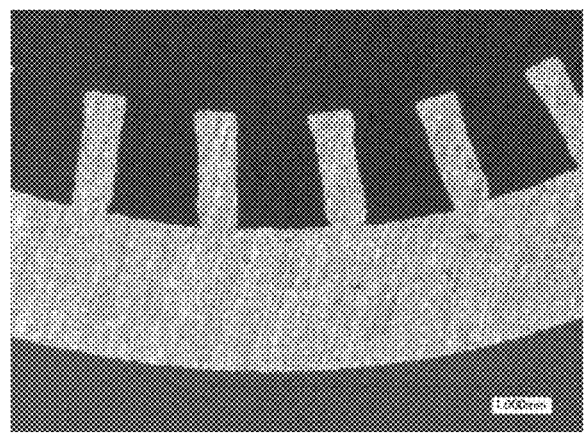
FIG. 10 is a partially enlarged photograph showing the inner spiral grooved tube of Example 1.

FIG. 10 shows a part of the cross section of the inner spiral grooved tube according to Example 1 of the present invention.

Figure 11:
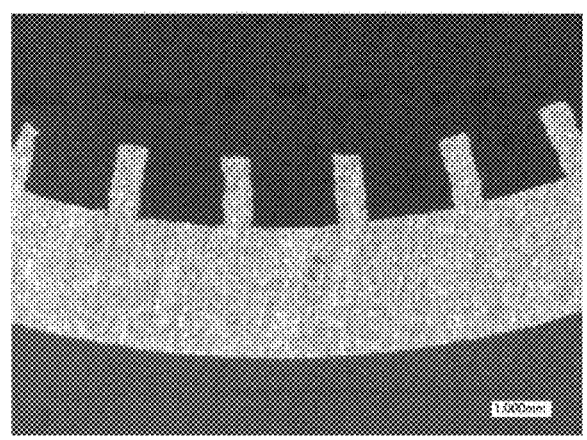
FIG. 11 is a partially enlarged photograph showing the inner spiral grooved tube of Example 2.

FIG. 11 shows a part of the cross section of the inner spiral grooved tube according to Example 2 of the present invention.

Figure 12:
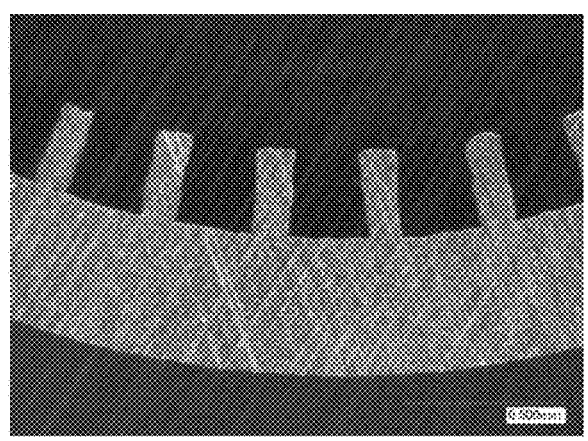
FIG. 12 is a partially enlarged photograph showing the inner spiral grooved tube of Example 11.

FIG. 12 shows a part of the cross section of the inner spiral grooved tube according to Example 11 of the present invention.

Figure 13:
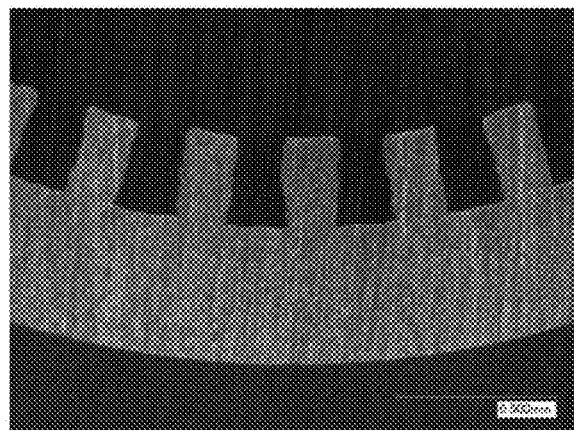
FIG. 13 is a partially enlarged photograph showing the inner spiral grooved tube of Example 12.

FIG. 13 shows a part of the cross section of the inner spiral grooved tube according to Example 12 of the present invention.

Figure 14:
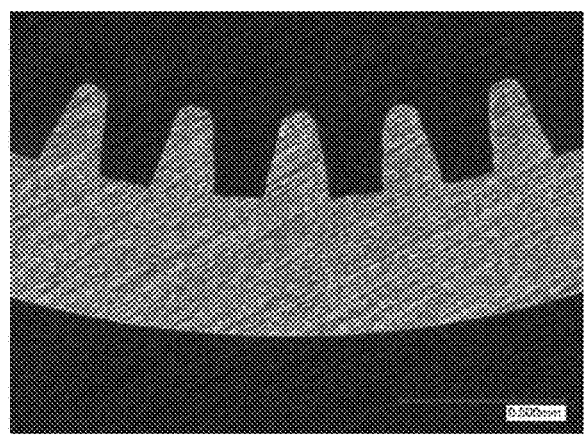
FIG. 14 is a partially enlarged photograph showing the inner spiral grooved tube of Comparative Example 1.

FIG. 14 shows a part of the cross section of the inner spiral grooved tube according to Comparative Example 1.

Figure 15:
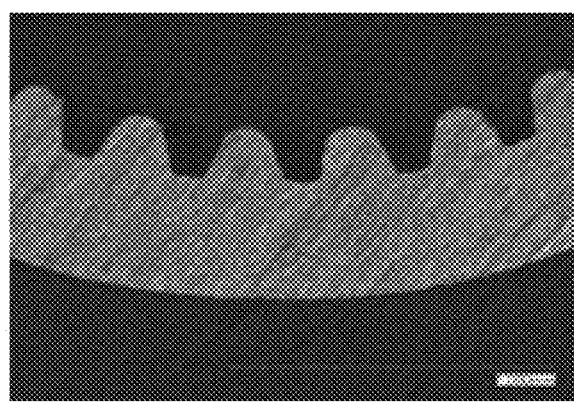
FIG. 15 is a partially enlarged photograph showing the inner spiral grooved tube of Comparative Example 4.

FIG. 15 shows a part of the cross section of the inner spiral grooved tube according to Comparative Example 4.

In the case of the inner spiral grooved tubes of Examples 1 to 13 of the present invention as shown in FIGS. 10 to 13, the fin apex angle is set to 0±10° and the cross section is rectangular, so that fins with good heat transfer efficiency can be provided.

In the inner spiral grooved tubes of Examples 1 to 13 of the present invention, the ratio (h/f) of the fin height (h) to the fin width (f) was 0.90 or more and 3.40 or less, so that the wet edge length of the refrigerant can be increased. In addition, the inner spiral grooved tube having good heat transfer efficiency can be provided.

In the inner spiral grooved pipes of Examples 1 to 13, the ratio (c/f) of the distance (c) between the fins adjacent to each other in the circumferential direction of the tube body and the fin width (f) was set in the range of 0.50 or more and 3.80 or less. Therefore, the distance between the fins could be widened, and the frontage was secured so that the refrigerant could easily enter the spiral groove. As a result, it was possible to In the inner spiral grooved pipes of Examples 1, 2, 7, 8 and 9 of the present invention, the fin apex angle was 0±5°.

In addition, the average value of the ratio (h/f) of the fin height (h) to the fin width (f) and the ratio (c/f) of the fin spacing between fins adjacent to each other in the circumferential direction of the tube body and the fin width (f) was set in the range of 2.4 to 2.6. As a result, it was possible to provide an inner spiral grooved tube having better heat transfer efficiency.

On the other hand, the inner spiral grooved tube of Example 11 had the fin apex angle of 0±5°. Further, the average value of the ratio (h/f) and the ratio (c/f) was within the desired range. Therefore, even if the wet edge length was the same as that of Examples 1 and 2, the heat exchange performance was slightly deteriorated in Example 11.

Next, the inner spiral grooved tube of Example 12 had the fin apex angle of 0±5°. Further, the ratio (h/f) was 1.8, and the ratio (c/f) was 1.1, both of which were values in the desired range. However, since the average value of the ratio (h/f) and the ratio (c/f) was less than 1.8, the heat exchange performance was lower than Examples 1 and 2, and slightly lower than that of Example 11.

Next, in the inner spiral grooved tube of Comparative Example 1, the average value of the ratio (h/f) and the ratio (c/f) was within the desired range. However, since the fin apex angle was wide, the thin liquid film could not be formed by a large amount of inflowing refrigerant. Thus, the heat exchange performance deteriorated because the drying phenomenon did not occur efficiently.

Next, in the inner spiral grooved tube of Comparative Example 2, the average value of the ratio (h/f) and the ratio (c/f) was out of the desired range to the upper side, which meant that there were relatively thin and high fins formed circumferentially. However, the spacing between the fin troughs became wider, resulting in a similar tendency of deteriorated heat exchange performance.

In Comparative Example 3, the number of fins was small, and the ratio (c/f) was 4.1, which was out of the desired range on the upper side. In Comparative Example 3, the thermal characteristics were deteriorated in the same tendency.

Next, the inner spiral grooved tube of Comparative Example 4 had a large fin apex angle and the ratio (h/f) of 0.85, which was out of the desired range downward. In addition, the presence of short fins in the circumferential direction reduced the length of the wet edge and deteriorated the heat exchange performance. In Comparative Examples 6 to 9, either or both of the ratio (h/f) and the ratio (c/f) deviated from the desired range to the lower side or the upper side, and the heat exchange performance deteriorated in the same tendency.

Next, the inner spiral grooved tube of Comparative Example 5 had a large fin apex angle on the negative side and the ratio (c/f) of 0.47, which was out of the desired range on the downward side. As a result, the frontage of the fin top was narrowed, so that the refrigerant did not flow efficiently and the heat exchange performance deteriorated. In Comparative Example 10, the number of fins was large and the ratio (h/f) was 3.6, which was out of the desired range on the upper side. In Comparative Example 10, the heat exchange performance deteriorated in the same tendency.

Next, in the inner spiral grooved tube of Comparative Example 11, the ratio (c/f) was out of the desired range upward, and the wet edge length was long. In Comparative Example 11, it became difficult to form a thin refrigerant film due to the wide space between the fins, and the heat exchange performance deteriorated due to inefficient drying.

The following shows some results when the heat exchange performance of the inner spiral grooved tube was evaluated by the evaluation method shown above.

Figure 16:
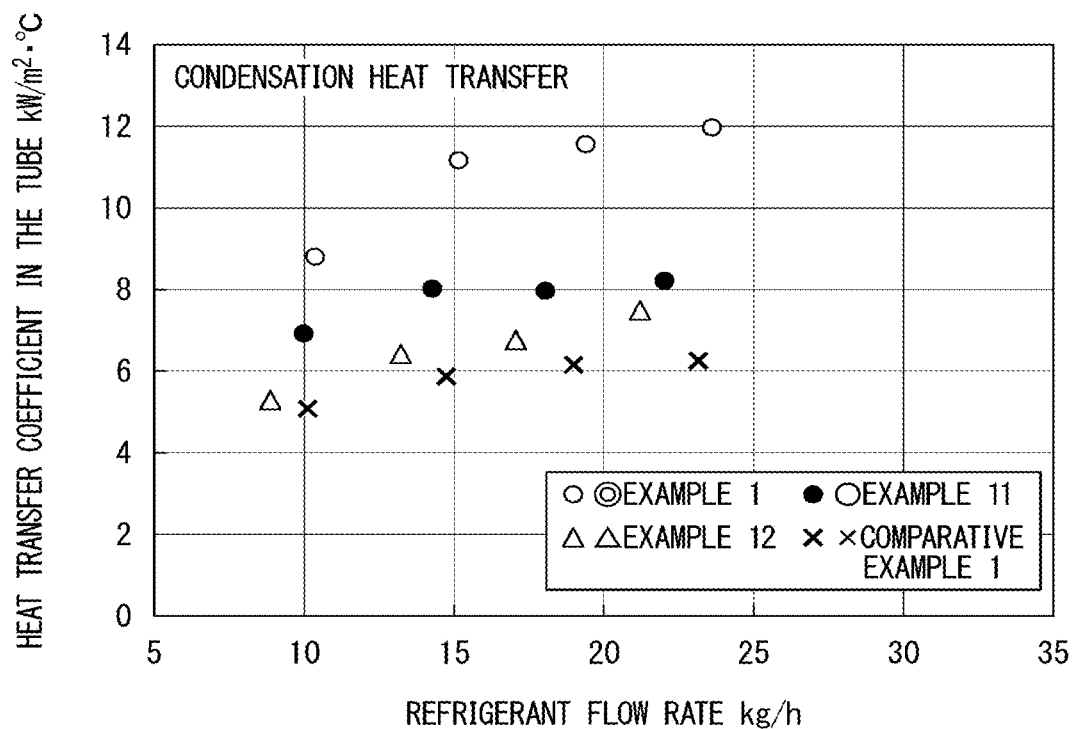
FIG. 16 is a graph showing an example of results measuring the condensation heat transfer rates of inner spiral grooved tubes of Examples 1, 11 and 12, and Comparative Example 1.

The graph shown in FIG. 16 shows the results of measuring the heat transfer coefficient of condensation for the inner spiral grooved tubes of Example 1 (A), Example 11 (B), Example 12 (C), and Comparative Example 1 (D). The graph shown in FIG. 17 shows the results of measuring the heat transfer coefficient of evaporation for the inner spiral grooved tubes of Example 1 (A), Example 11 (B), Example 12 (C), and Comparative Example 1 (C).

Figure 17:
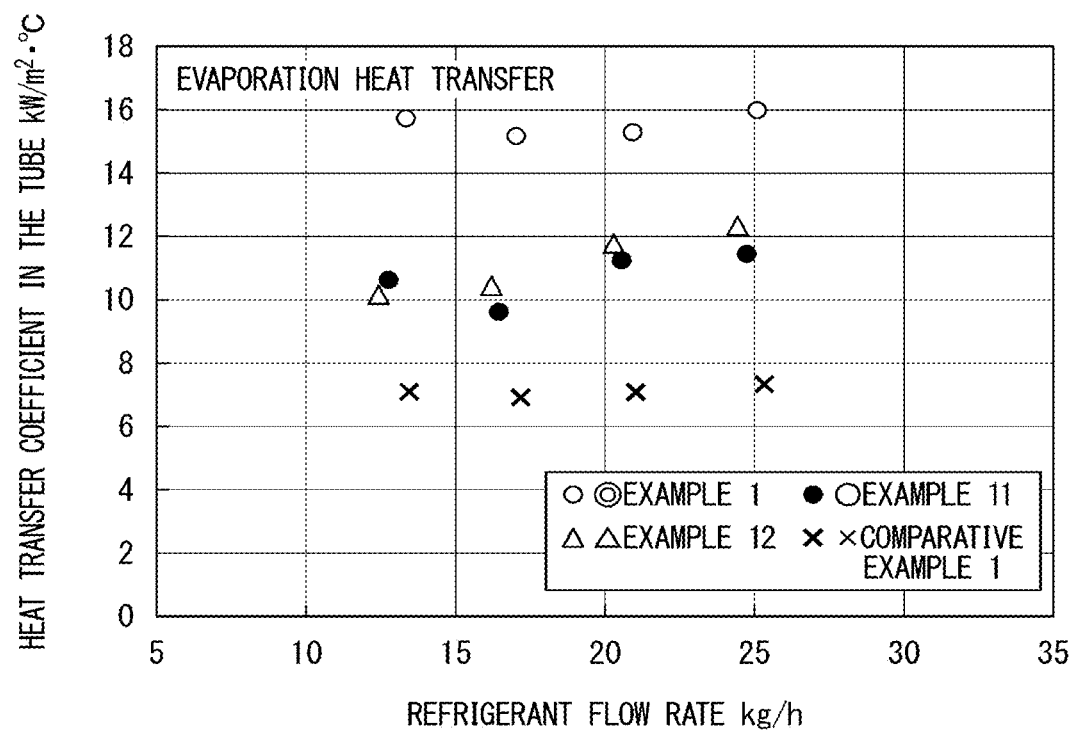
FIG. 17 is a graph showing an example of results measuring the evaporation heat transfer rates of inner spiral grooved tubes of Examples 1, 11 and 12, and Comparative Example 1.

As shown in the graphs shown in FIGS. 16 and 17, it is clear that the heat transfer coefficient was improved in the inner spiral grooved tubes of Examples 1, 11 and 12 from the results of both condensation heat transfer and evaporation heat transfer with respect to the inner spiral grooved tube of Comparative Example 1.

Based on the above-described results, it can be concluded that it is possible to secure a long wet edge length of the refrigerant flowing inside, and to provide an inner spiral grooved tube having excellent heat transfer property in which the refrigerant easily enters between the fins, by configuring the spiral fins to have a rectangular cross sectional shape with the fin apex angle in the range of 0±10°, 0.90 or more and 3.40 or less of the ratio h/f between the height and the width, and 0.50 or more and 3.80 or less of the ratio c/f between the spacing and the width, in an inner spiral grooved tube made of a metal having an outer diameter of 3 mm or more and 10 mm or less and having 30 to 60 fins.

As shown in the graphs shown in FIGS. 16 and 17, these relationships remained unchanged as the refrigerant flow rate increased or decreased. Therefore, it is clear that the inner spiral grooved tube of Example 1 had an improved heat transfer coefficient in both condensation and evaporation heat transfer compared to the inner spiral grooved tube of Comparative Example 1.

Depending on the shape of the inner grooves, the heat transfer performance varied. In the heat exchanger performance evaluation at a refrigerant flow rate of approximately 20 kg/h, when the heat transfer coefficient of condensation was 6.5 kW/m²×° C. or less and the heat transfer coefficient of evaporation was 8.0 kW/m²×° C. or less, it was ranked as D (Bad). When the heat transfer coefficient of condensation is more than 6.5 kW/m²×° C. and 8.0 kW/m²×° C. or less, and the heat transfer coefficient of evaporation was more than 8.0 kW/m²×° C. and 12.0 kW/m²×° C. or less, it was ranked as C (Mediocre). When the heat transfer coefficient of condensation is more than 8.0 kW/m²×° C. and 9.5 kW/m²×° C. or less, and the heat transfer coefficient of evaporation was more than 8.0 kW/m²×° C. and 12.0 kW/m²×° C. or less, it was ranked as B (Good). When the heat transfer coefficient of condensation is more than 9.5 kW/m²×° C., and the heat transfer coefficient of evaporation was more than 12.0 kW/m²×° C., it was ranked as A (Very Good).

Figure 18:
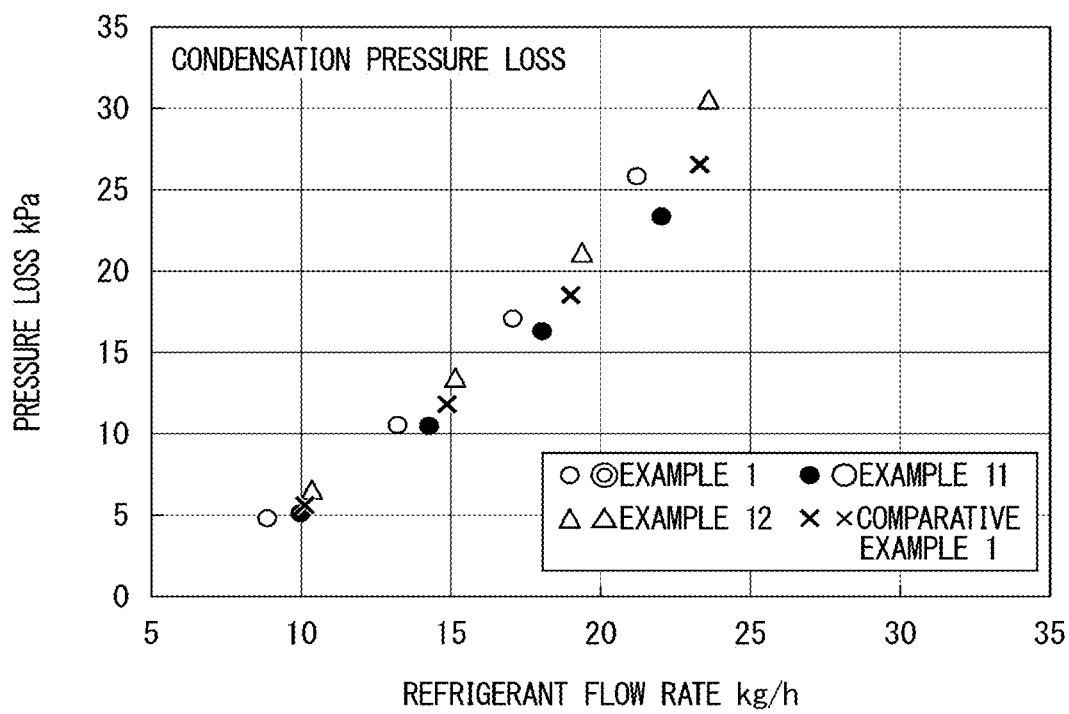
FIG. 18 is a graph showing an example of results measuring the condensation pressure loss of inner spiral grooved tubes of Examples 1, 11 and 12, and Comparative Example 1.

The graph shown in FIG. 18 shows the results of measuring the condensation pressure loss of the inner spiral grooved tube of Example 1 (A), Example 11 (B), Example 12 (C), and Comparative Example 1 (C). The graph shown in FIG. 19 shows the results of measuring the evaporation pressure loss of the inner spiral grooved tube of Example 1 (A), Example 11 (B), Example 12 (C), and Comparative Example 1 (C).

Figure 19:
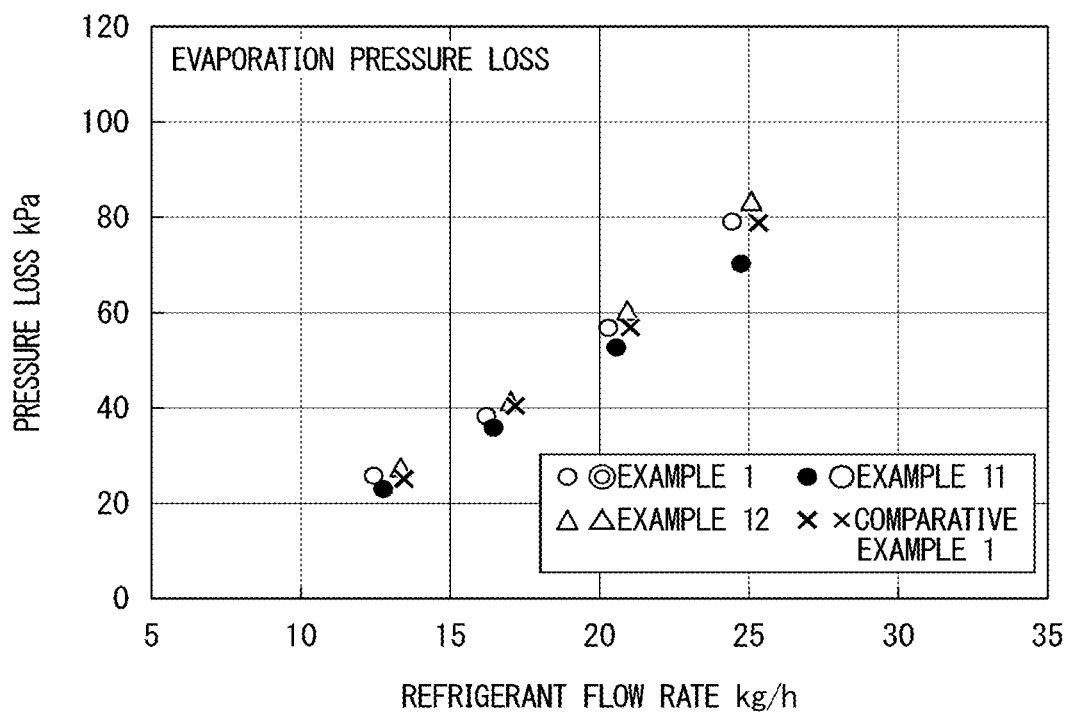
FIG. 19 is a graph showing an example of results measuring the evaporation pressure loss of inner spiral grooved tubes of Examples 1, 11 and 12, and Comparative Example 1.

From the comparison between the graph shown in FIG. 18 and the graph shown in FIG. 19, the followings can deduced by comparing the inner spiral grooved tube of Examples 1, 11 and 12 with the inner spiral grooved tube of Comparative Example 1. In these cases, the values of the condensation pressure loss and the evaporation pressure loss are almost the same. Regarding the pressure loss in a wide range of the refrigerant flow rate of 10 to 25 kg/h, no superiority or inferiority is observed among them, and they have the same performance.

Therefore, excellent thermal conductivity can be obtained in the inner spiral grooved tubes according to Examples 1, 11 and 12 in a wide refrigerant flow rate range.

REFERENCE SIGNS LIST

1: heat exchanger
2: inner spiral grooved tube,
3: heat dissipating plate
6: tube body,
6a: outer peripheral surface
6b: inner peripheral surface
7: fin
7a: tip part
7b: bottom part
7c: sidewall part
8: spiral groove
9: raw tube
9A: straight fin
9B: straight groove
A: manufacturing apparatus
14: fin
14b: bottom part
14c: sidewall part
16: spiral groove
a: fin top width
b: fin bottom width
c: fin spacing
h: fin height
θ: fin apex angle 11: unwound bobbin
17: first drawing dice
18: first guide capstan
19: second drawing dice
21: first revolving capstan
22: second revolving capstan
23: revolving flyer

The invention claimed is:

1. An inner spiral grooved tube, comprising:
a tube body; and
a plurality of grooves and a plurality of fins aligned in an inner circumferential direction of the tube body, wherein
the grooves and the fins are formed in a spiral along a longitudinal direction of the tube body,
an outer diameter of the tube body is 3 mm or more and 10 mm or less,
a number of the fins formed on an inner peripheral surface of the tube body is 30 to 60,
the inner spiral grooved tube is made of a metal,
a cross sectional shape of each of the fins in a cross section of the tube body has an isopod trapezoidal shape, an apex angle formed by sidewalls of the isopod trapezoidal shape being −2.5° or more and 2.5° or less,
a ratio h/f is 1.750 or more and 3.161 or less, h being a fin height and f being fin width,
a ratio c/f is 1.547 or more and 2.965 or less, c being a fin spacing between adjacent fins in the inner circumferential direction of the tube body,
an average obtained by summing the ratio h/f and the ratio c/f and dividing a sum in half is 2.4 or more and 2.6 or less,
the fins are arranged with an equal spacing in the inner circumferential direction of the tube body,
the tube body is made of aluminum or an aluminum alloy,
an average of the upper width and the lower width of the fin is 0.091 mm or more and 0.138 or less, and
the fin height is 0.227 mm or more and 0.392 mm or less.

2. A heat exchanger, comprising the inner spiral grooved tube according to claim 1.

* * * * *